United States Patent
Hori et al.

[11] Patent Number: 6,142,129
[45] Date of Patent: Nov. 7, 2000

[54] BREATHER APPARATUS FOR ENGINE

[75] Inventors: Yoshiaki Hori; Tohru Nishi, both of Saitama, Japan

[73] Assignee: Honda Giken Kogyo Kabushiki Kaisha, Tokyo, Japan

[21] Appl. No.: 09/447,056

[22] Filed: Nov. 23, 1999

[30] Foreign Application Priority Data

Nov. 25, 1998 [JP] Japan ................................ 10-333644

[51] Int. Cl.$^7$ .............................. F01M 13/04; F01L 1/02
[52] U.S. Cl. ........................................ 123/572; 123/55.2
[58] Field of Search .................................. 123/572, 573, 123/574, 41.86, 55.2

[56] References Cited

U.S. PATENT DOCUMENTS 5,690,084  11/1997  Gunji et al. .............................. 123/572
5,937,836   8/1999  Yonezawa et al. ...................... 123/572

FOREIGN PATENT DOCUMENTS 27-9171  2/1995  Japan .

Primary Examiner—Marguerite McMahon
Attorney, Agent, or Firm—Birch, Stewart, Kolasch & Birch, LLP

[57] ABSTRACT

To provide a breather apparatus for a horizontally-opposed type or a V-type engine in which first and second cylinder blocks having first and second cylinder bores are commonly connected to a crank case in such a manner that the axial line of the first cylinder bore is offset from the axial line of the second cylinder bore to one side of the crank shaft along the axial line of the crank shaft. A cam chain chamber is provided in the crank case, the cylinder blocks and the cylinder heads on one side of the crank shaft along the axial line of the crank shaft. Furthermore, a breather chamber is formed in the second cylinder block, the second cylinder head, and the crank case at a position between the cam chain chamber and the second cylinder bore. The breather chamber has a relatively large capacity, while enlargement of the engine is avoided.

12 Claims, 13 Drawing Sheets

BREATHER APPARATUS FOR ENGINE

BACKGROUND OF THE INVENTION

1. Field of the Invention

The present invention relates to an improvement in a breather apparatus for a horizontally-opposed engine or a V-type engine.

2. Description of Related Art

A breather apparatus has been known, for example, from Japanese Patent Publication No. Hei 7-9171, in which a breather chamber for separating oil mist from breather gas fed from a crank case and returning the oil mist into the crank case is formed in an engine main body.

The above-described prior art breather apparatus, however, is problematic. The breather chamber is formed adjacent to a cam chain chamber in a plane perpendicular to the axial line of a crank shaft. Furthermore, to ensure the capacity of the breather chamber, the cam chain chamber is formed along a direction tilting at an acute angle formed with respect to a straight line connecting the crank shaft to the cam shaft. As a result, the engine main body is inevitably enlarged in size.

SUMMARY OF THE INVENTION

In a horizontally-opposed type or a V-type engine including a pair of cylinder blocks commonly connected to a crank case, the axial lines of cylinder bores provided in the cylinder blocks are offset in the axial line direction of the crank shaft. Therefore, a relatively large space is formed between one of the cylinder bores and a cam chain chamber for containing a cam chain. The cam chain for reducing the rotational power of the crank shaft into half and transmitting the reduced rotational power to the cam shaft. As a result, if a breather chamber is formed by making effective use of such a space, it is possible to make the relatively large breather chamber in terms of capacity thereof without enlarging the size of the engine main body.

In view of the foregoing, the present invention has been made, and an object of the present invention is to provide a breather apparatus for a horizontally-opposed type or a V-type engine, which is capable of forming a breather chamber having a relatively larger capacity while avoiding enlargement of the size of the engine.

To achieve the above object, according to a first aspect of the present invention, there is provided a breather apparatus for an engine in which first and second cylinder blocks having first and second cylinder bores extending in directions tilting from each other at an angle formed in a plane perpendicular to the axial line of a crank shaft, respectively, are commonly connected to a crank case in such a manner that the axial line of the first cylinder bore is offset from the axial line of the second cylinder bore on one side of the crank shaft along the axial line of the crank shaft. Furthermore; first and second cylinder heads forming combustion chambers between the first and second cylinder heads and pistons slidably fitted in the cylinder bores are connected to the first and second cylinder blocks, respectively. In addition, a cam chain chamber is provided in the crank case, the cylinder blocks and the cylinder heads on one side of the crank shaft along the axial line of the crank shaft. First and a second cam chains for reducing the rotational power of the crank shaft into half and transmitting the reduced rotational power to one-ends of the first and the second cam shafts linked to intake valves and exhaust valves for taking air in the combustion chambers and discharging the exhaust gas from the combustion chambers, respectively, are contained in the cam chain chamber. The breather apparatus is characterized in that a breather chamber is provided in the second cylinder block, the second cylinder head and the crank case at a position between the cam chain chamber and the second cylinder bore.

With this configuration, since the axial line of the first cylinder bore is offset from the axial line of the second cylinder bore to one side of the crank shaft along the axial line direction of the crank shaft and the cam chain chamber is provided in the crank case, both of the cylinder blocks and the cylinder heads on one side along the axial line of the crank shaft, a relatively large space is formed between the second cylinder bore and the cam chain chamber. Therefore, the breather chamber can be provided in the crank case, the second cylinder block and the second cylinder head by making effective use of such a space. As a result, it is possible to form a breather chamber having a relatively large capacity while avoiding the enlargement of the entire engine, and hence improving the breather performance.

According to a second aspect of the present invention, in addition to the configuration of the first aspect of the present invention, a pair of through-holes extending in parallel to the axial line of the second cylinder bore are provided in the second cylinder block. The breather chamber includes a first chamber formed between the second cylinder block and the crank case and in communication with the interior of the crank case. A second chamber is in communication with the first chamber and formed in one through-hole. A third chamber is formed between the second cylinder block and the second cylinder head and in communication with the second chamber. Furthermore; a fourth chamber is in communication with the third chamber but blocked from the first chamber and formed in the other through-hole. In addition; a breather gas outlet in communication with the fourth chamber is provided in the second cylinder block. With this configuration, since the breather chamber has a labyrinth structure, it is possible to effectively separate oil mist from the breather gas and hence to further improve the breather performance.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Figure 1:
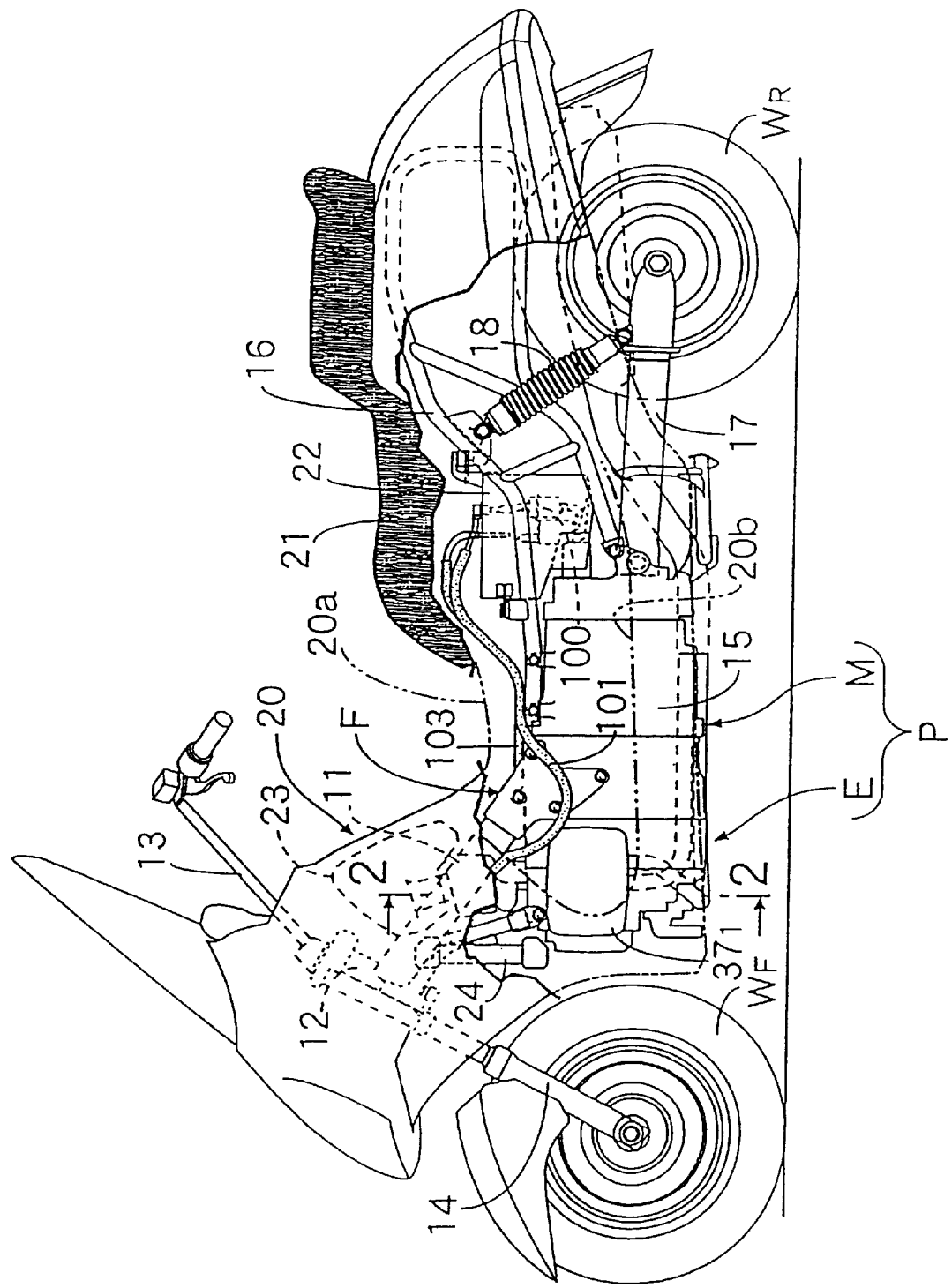
FIG. 1 is a side view of a motorcycle to which the present invention is applied.

Hereinafter, one embodiment of the present invention will be described with reference to the accompanying drawings. Referring first to FIG. 1, there is shown a low floor type motorcycle on which a power unit P composed of a horizontally-opposed type two-cylinder/four-cycle engine E and a transmission M is mounted.

A body frame F includes a pair of right and left main frames 11 extending downwardly, rearwardly from the front side of the motorcycle in the running direction of the motorcycle. A steering handle 13 is steerably supported by a head pipe 12 commonly provided at the front ends of a pair of the main frames 11. A front wheel WF is suspended from a front fork 14 tumnable together with the steering handle 13.

The rear ends of both of the main frames 11 are connected to a transmission case 15 of the transmission M of the power unit P. The transmission case 15 constitutes a part of the body frame F.

Front ends of a pair of right and left rear frames 16 extending to the rear side of the motorcycle are connected to the transmission case 15. The front end of a rear fork 17 is vertically swingably connected to the transmission case 15. A rear wheel W, is rotatably supported by the rear end of the rear fork 17. A cushion unit 18 is provided between a rear portion of the rear fork 17 and each of the rear frames 16. A drive shaft (not shown) for transmitting the output of the transmission M to the rear wheel WR is contained in the rear fork 17. The drive shaft is connected to an output member of the transmission M via a universal joint.

The entire body frame F is covered with a body cover 20 made from a synthetic resin. A tunnel portion 20a for covering the power unit P is formed at an intermediate portion of the body cover 20 in the longitudinal direction. A seat 21 on which a driver is to be seated is provided on the body cover 20 at a position behind the tunnel portion 20a, and steps 20b on which the driver is to rest her/his foot are provided on the right and left sides of the tunnel portion 20a. A fuel tank 22 is mounted on the rear frames 16 in such a manner as to be located under the seat 21 and to be covered by the body cover 20. An air cleaner 23 is mounted on the main frames 11 in such a manner as to be located above the engine E. A pair of right and left radiators 24 are mounted on the main frames 11 between the air cleaner 23 and the engine E. The air cleaner 23 and the radiators 24 are also covered by the body cover 20, and openings (not shown) through which running wind is introduced to the air cleaner 23 and the radiators 24 are formed in the front end portion of the body cover 20.

Figure 2:
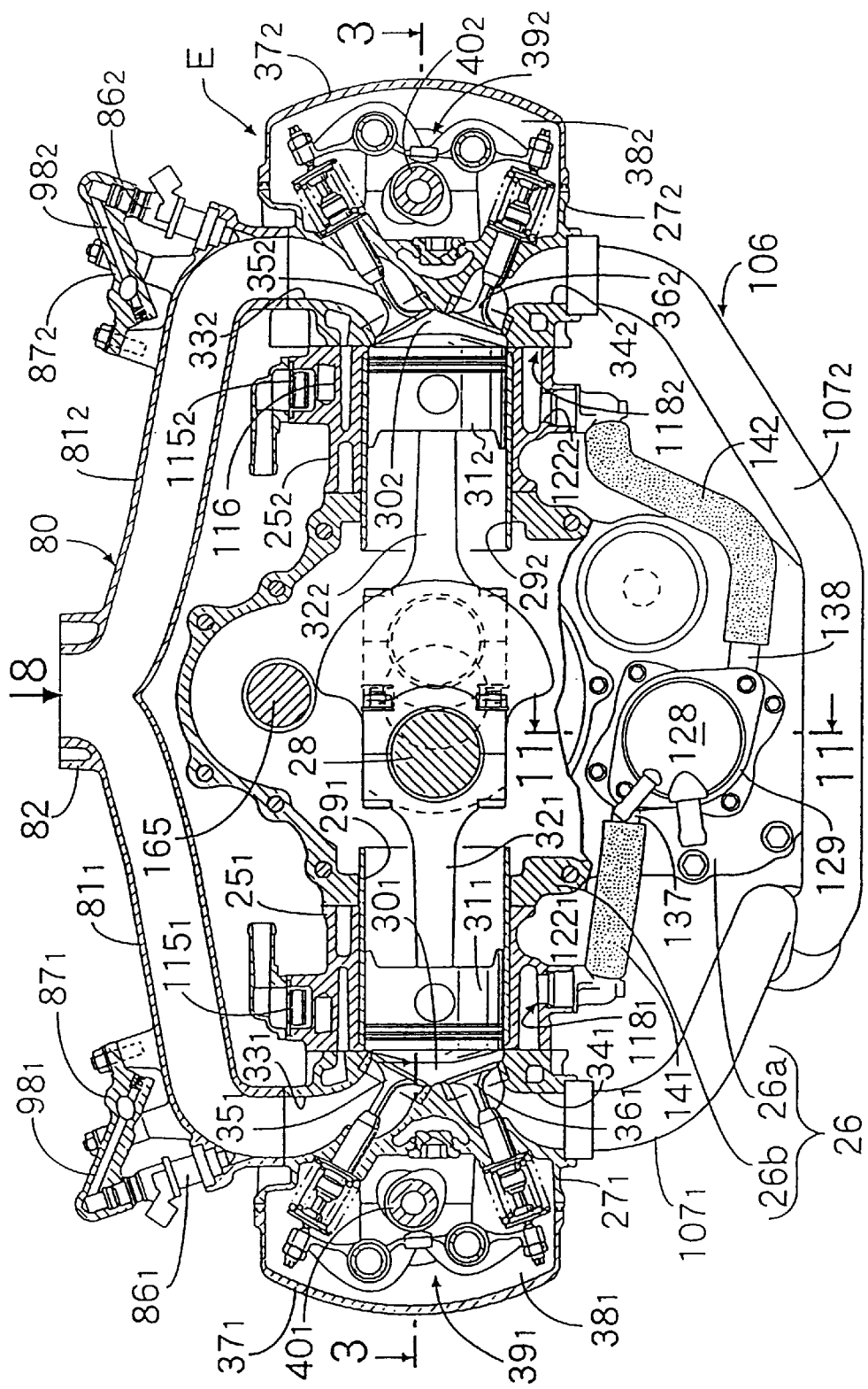
FIG. 2 is an enlarged sectional view taken on line 2—2 of FIG. 1.
Figure 3:
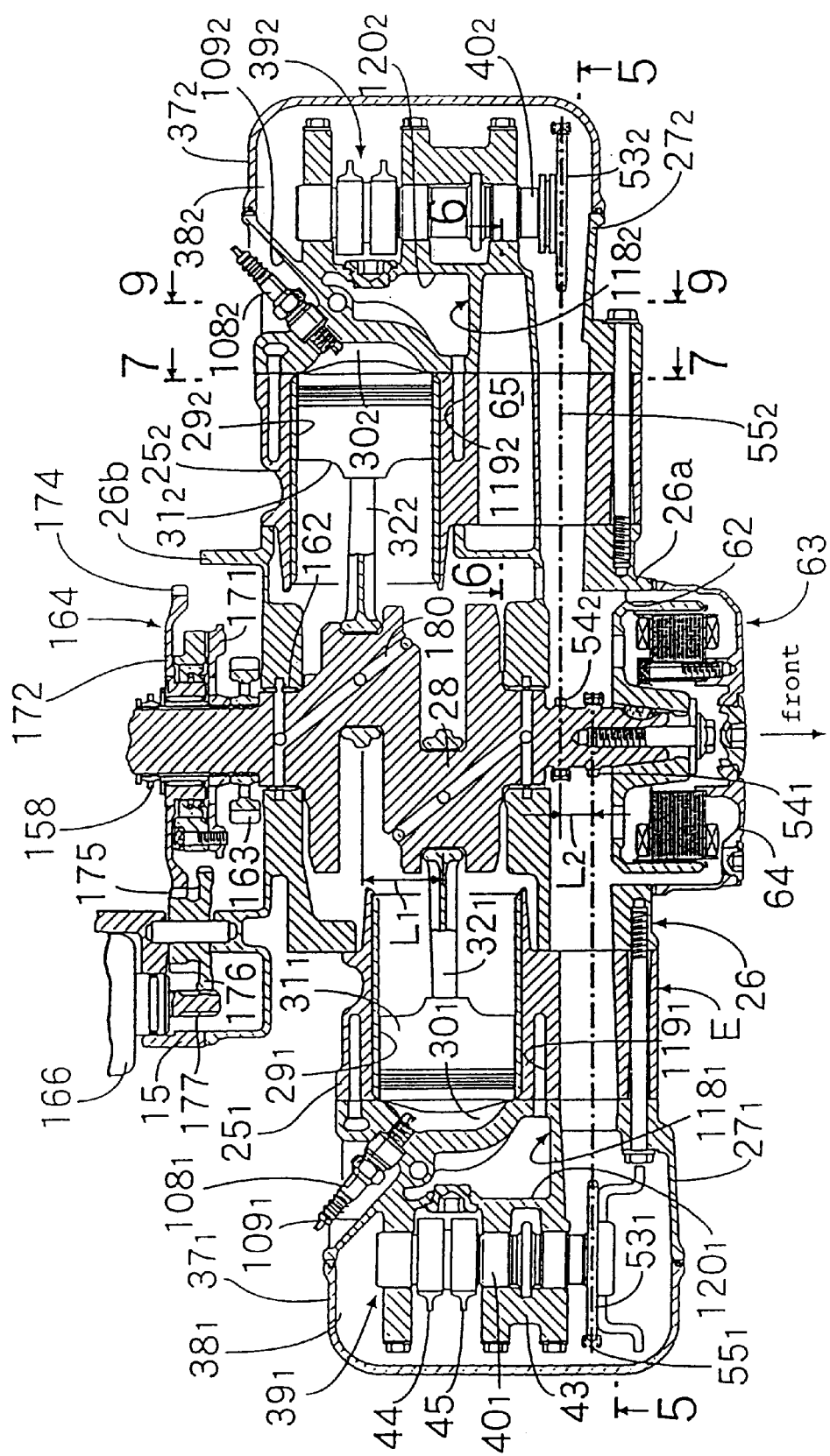
FIG. 3 is a sectional view taken on line 3—3 of FIG. 2.

Referring to FIGS. 2 and 3, a main body of the engine E includes a first cylinder block $25_1$ disposed on the right side when the motorcycle is directed forwardly in the running direction; a second cylinder block $25_2$ disposed on the left side when the motorcycle is directed forwardly in the running direction; a crank case 26 commonly connected to the cylinder blocks $25_1$ and $25_2$; a first cylinder head $27_1$ connected to the first cylinder block $25_1$ on a side opposite to the crank case 26; and a second cylinder head $27_2$ connected to the second cylinder block $25_2$ on the opposed side to the crank case 26.

The crank case 26 is formed by connecting a front case half 26a on the front side in the longitudinal direction of the motorcycle to a rear case half 26b on the rear side in the longitudinal direction of the motorcycle. A crank shaft 28 having a substantially horizontal axial line in the longitudinal direction of the motorcycle is rotatably supported by the crank case 26. First and second cylinder bores $29_1$ and $29_2$, which extend in opposite directions from each other at 180° with respect to the axial line of the crank shaft 28, are provided in the first and second cylinder blocks $25_1$ and $25_2$ in such a manner that the axial lines of the cylinder bores $29_1$ and $29_2$ are directed substantially in the horizontal direction.

A piston $31_1$, which forms a combustion chamber $30_1$ between the first cylinder head $27_1$ and the same, is slidably fitted in the first cylinder bore $29_1$. A piston $31_2$, which forms a combustion chamber $30_2$ between the second cylinder head $27_2$ and the same, is slidably fitted in the second cylinder bore $29_2$. Both of the pistons $31_1$ and $31_2$ are commonly connected to the crank shaft 28 via connecting rods $32_1$ and $32_2$, respectively. The first and second cylinder blocks $25_1$ and $25_2$ are connected to the crank case 26 in such a manner that the axial line of the first cylinder bore $29_1$ is offset by an offset amount $L_1$ from the axial line of the cylinder bore $29_2$ onto one side in the axial direction of the crank shaft 28, more specifically, on the front side in the longitudinal direction of the motor cycle in this embodiment.

An intake port $33_1$ (or $33_2$) in communication with the combustion chamber $30_1$ (or $30_2$) is opened in an upper surface portion of the first cylinder head $27_1$ (or second cylinder head $27_2$). An exhaust port $34_1$ (or $34_2$) in communication with the combustion chamber $30_1$ (or $30_2$) is opened in a lower surface portion of the cylinder head $27_1$ (or $27_2$).

Figure 4:
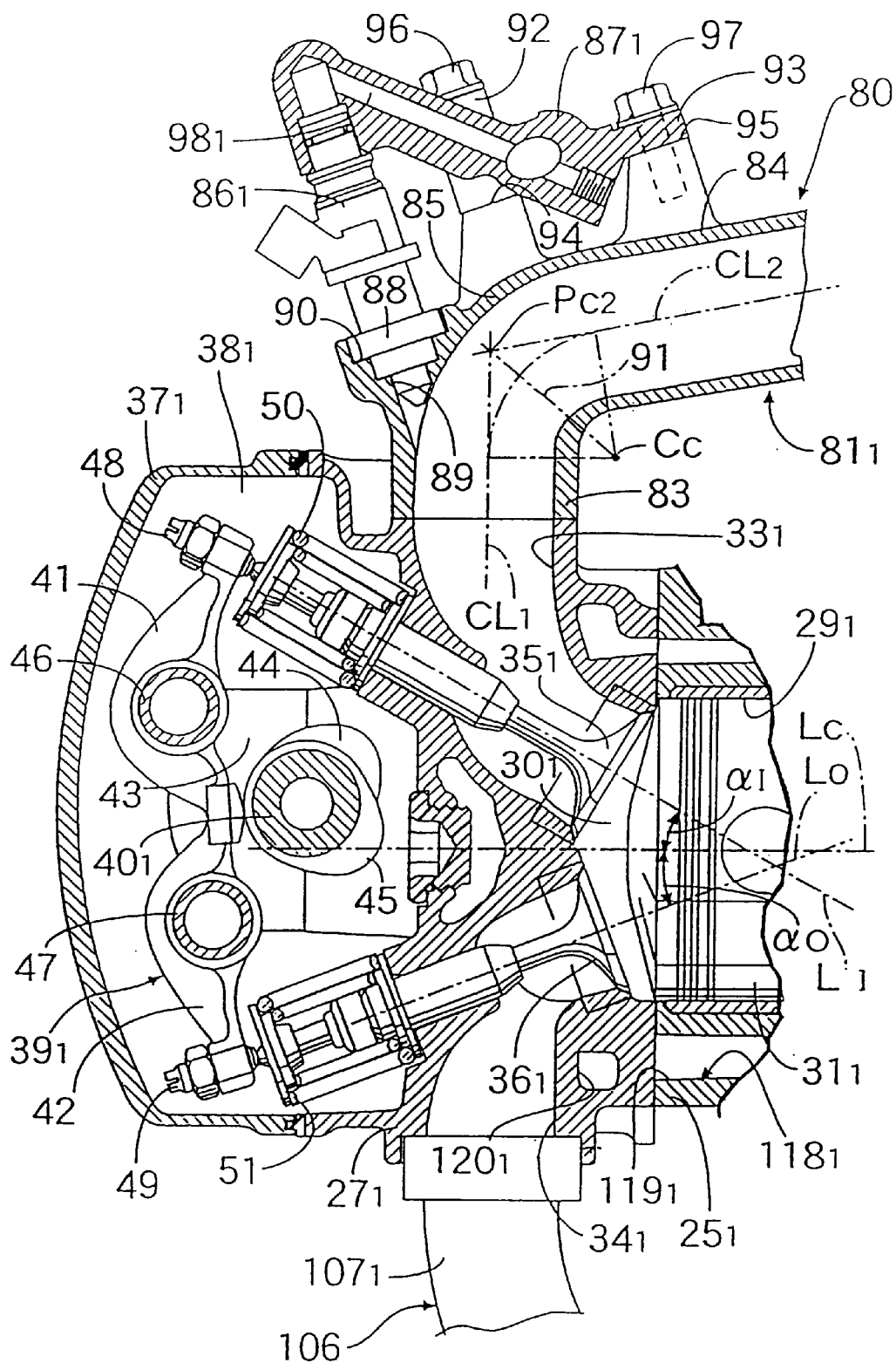
FIG. 4 is an enlarged view of an essential portion shown in FIG. 2.

Referring particularly to FIG. 4, the first cylinder head $27_1$ has an intake valve $35_1$ for opening/closing the intake port $33_1$ in communication with the combustion chamber $30_1$ thereby taking air in the combustion chamber $30_1$, and an exhaust valve $36_1$ for opening/closing the exhaust port $34_1$ in communication with the combustion chamber $30_1$ thereby exhausting air from the combustion chamber $30_1$. The intake valve $35_1$ and exhaust valve $36_1$ are openably/closably operated. The intake valve $35_1$ and the exhaust valve $36_1$ are arranged in such a manner as to have operational axial lines $L_I$ and $L_O$ crossing each other into an approximately V-shape on a projection plane perpendicular to the axial line of the crank shaft 28 and including the axial line of the first cylinder bore $29_1$ (see FIG. 4). Furthermore, on the projection plane, an angle $\alpha_I$ formed between the axial line $L_C$ of the first cylinder bore $29_1$ and the operational axial line $L_I$ of the intake valve $35_1$ is larger than an angle $\alpha_O$, formed between the axial line $L_C$ of the first cylinder bore $29_1$ and the operational axial line $L_O$ of the exhaust valve $36_1$ ($\alpha_I > \alpha_O$). Furthermore, the intake valve $35_1$ and the exhaust valve $36_1$ are arranged in the first cylinder head $27_1$ in such a manner that a crossing point $P_{C1}$ at which the operational axial lines $L_I$ and $L_O$ of the intake valve $35_1$ and the exhaust valve $36_1$ cross each other on the projection plane is lower than the axial line $L_C$ of the first cylinder bore $29_1$.

An intake valve $35_2$ for opening/closing the intake port $33_2$ in communication with the combustion chamber $30_2$ thereby taking air in the combustion chamber $30_2$, and an exhaust valve $36_2$ for opening/closing the exhaust port $34_2$ in communication with the combustion chamber $30_2$ thereby taking air in the combustion chamber $30_2$ are arranged in the second cylinder head $27_2$ in accordance with the same angular and positional relationship as that for the intake valve $35_1$ and the exhaust valve $36_1$ arranged in the first cylinder head $27_1$.

A first head cover $37_1$ (or second head cover $37_2$), which forms a first valve system chamber $38_1$ (or second valve system chamber $38_2$) between the first cylinder head $27_1$ (or $27_2$) and the same, is connected to the first cylinder head $27_1$ (or second cylinder head $27_2$). A first valve system mechanism $39_1$ for opening/closing the intake valve $35_1$ and the exhaust valve $36_1$ is contained in the first valve system chamber $38_1$, and a second valve system mechanism $39_2$ for opening/closing the intake valve $35_2$ and the exhaust valve $36_1$ is contained in the second valve system chamber $38_2$.

The first valve system mechanism $39_1$ includes a first cam shaft $40_1$ having an axial line parallel to the axial line of the crank shaft 28, an intake side rocker arm 41 for converting the rotational motion of the cam shaft $40_1$ into the linear opening/closing motion of the intake valve $35_1$, and an exhaust side rocker arm 42 for converting the rotational motion of the first cam shaft $40_1$ into the linear opening/closing motion of the exhaust valve $36_1$.

The first cam shaft $40_1$ is located above the axial line $L_C$ of the first cylinder bore $29_1$ and between the intake valve $35_1$ and the exhaust valve $36_1$. The first cam shaft $40_1$ is rotatably supported by the first cylinder head $27_1$ and a holder 43 connected to the first cylinder head $27_1$.

The first cam shaft $40_1$ has an intake side cam 44 corresponding to the intake valve $35_1$ and an exhaust side cam 45 corresponding to the exhaust valve $36_1$. The intake side and exhaust side rocker arms 41 and 42 are respectively swingably supported by supporting shafts 46 and 47 which have axial lines parallel to the first cam shaft $40_1$ and are supported by the holder 43. One-sided ends of the intake side and exhaust side rocker arms 41 and 42 are slidably in contact with the intake side and exhaust side cams 44 and 45, respectively. Tappet screws 48 and 49 are fittingly screwed in the other ends of the intake side and exhaust side rocker arms 41 and 42, respectively. The intake valves $35_1$ and $36_1$, which are biased in the valve closing direction by valve springs 50 and 51 provided between the first cylinder head $27_1$ and the same, are in contact with the tappet screws 48 and 49, respectively.

A second valve system mechanism $39_2$ contained in a valve system chamber $38_2$ provided between the second cylinder head $27_2$ and the second head cover $37_2$ has a second cam shaft $40_2$ and is configured like the first valve system mechanism $39_1$.

Figure 5:
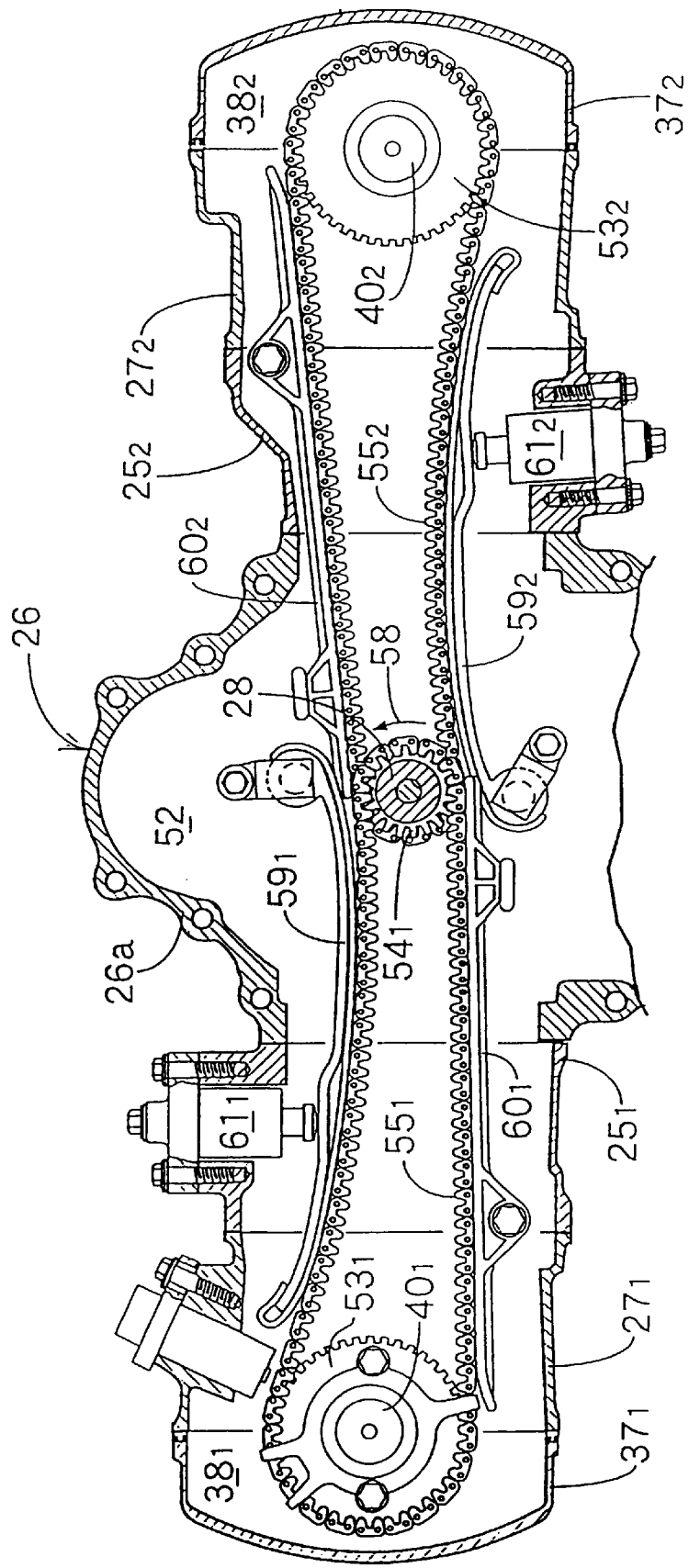
FIG. 5 is a sectional view taken on line 5—5 of FIG. 3.

Referring particularly to FIG. 5, in the front case half 26a of the crank case 26, the first and second cylinder block $25_1$ and $25_2$, and the first and second cylinder heads $27_1$ and $27_2$, a cam chain chamber 52 for communicating both of the valve system chambers $38_1$ and $38_2$ with the crank case 26 is provided on the offset side of the axial line of the first cylinder bore $29_1$ from the axial line of the second cylinder bore $29_2$, i.e., on the front end side of the motorcycle in the longitudinal direction.

A driven sprocket $53_1$ is fixed to one end portion, on the cam chain chamber 52 side, of the first cam shaft $40_1$ of the first valve system mechanism $39_1$, and a driven sprocket $53_2$ is fixed to one end portion, on the cam chain chamber 52 side, of the second cam shaft $40_2$ of the second valve system mechanism $39_2$. In the cam chain chamber $52_1$ a drive sprocket $54_1$ corresponding to the driven sprocket $53_1$ and a drive sprocket $54_2$ corresponding to the driven sprocket $53_2$ are fixed to the crank shaft 28. An endless cam chain $55_1$ is wound around the drive sprocket $54_1$ and the driven sprocket $53_1$ for transmitting the rotational power of the crank shaft 28 reduced into half to the first cam shaft $40_1$. An endless cam chain $55_2$ is wound around the drive sprocket $54_2$ and the driven sprocket $53_2$ for transmitting the rotational power of the crank shaft 28 reduced into half to the second cam shaft $40_2$.

In accordance with the offset of the axial line of the first cylinder bore $29_1$ from the axial line of the second cylinder bore $29_2$ by the offset amount $L_1$ in the axial direction of the crank shaft 28, the combination of the drive sprocket $54_1$, the driven sprocket $53_1$ and the cam chain $55_1$ is offset from the combination of the drive sprocket $54_2$, the driven sprocket $53_2$, and the cam chain $55_2$ by an offset amount $L_2$ in the axial direction of the crank shaft 28. In this case, in order to miniaturize the engine main body in the axial direction of the crank shaft 28, the offset amount $L_2$ is set to be smaller than the offset amount $L_1$ ($L_2<L_1$).

The crank shaft 28 is rotated in the rotational direction shown by an arrow 58 in FIG. 5. A chain tensioner $59_1$ is elastically, slidably in contact with the forward running portion, i.e., the upper running portion of the cam chain $55_1$ in the direction from the drive sprocket $54_1$ to the driven sprocket 53. A chain guide $60_1$ is slidably in contact with the backward running portion, i.e., the lower running portion of the cam chain $55_1$ in the direction from the driven sprocket $53_1$ to the drive sprocket $54_1$.

One end portion of the chain tensioner $59_1$ is turnably supported by the crank case 26. A tensioner lifter $61_1$, which is in contact with an intermediate portion of the chain tensioner $59_1$ in the longitudinal direction and presses the chain tensioner $59_1$ to the cam chain $55_1$, is mounted in the upper portion of the first cylinder block $25_1$.

A chain tensioner $59_2$ is elastically, slidably in contact with the forward running portion, i.e., the lower running portion of the cam chain $55_2$ in the direction from the drive sprocket $54_2$ to the driven sprocket $53_1$. A chain guide $60_1$ is slidably in contact with the backward running portion, i.e., the upper running portion of the cam chain $55_1$ in the direction from the driven sprocket $53_2$ to the drive sprocket $54_2$.

One end portion of the chain tensioner $59_2$ is turnably supported by the crank case 26. A tensioner lifter $61_2$, which is in contact with an intermediate portion of the chain tensioner $59_2$ in the longitudinal direction and presses the chain tensioner $59_2$ to the cam chain $55_2$, is mounted in the lower portion of the second cylinder block 25.

The front case half 26a of the crank case 26 has an opening 62 at the front end in the longitudinal direction of the motorcycle. A case 64 for a power generator 63 coaxially connected to the crank shaft 28 in the cam chain chamber 52 is fastened to the front case half 26a in such a manner as to close the opening 62.

Figure 6:
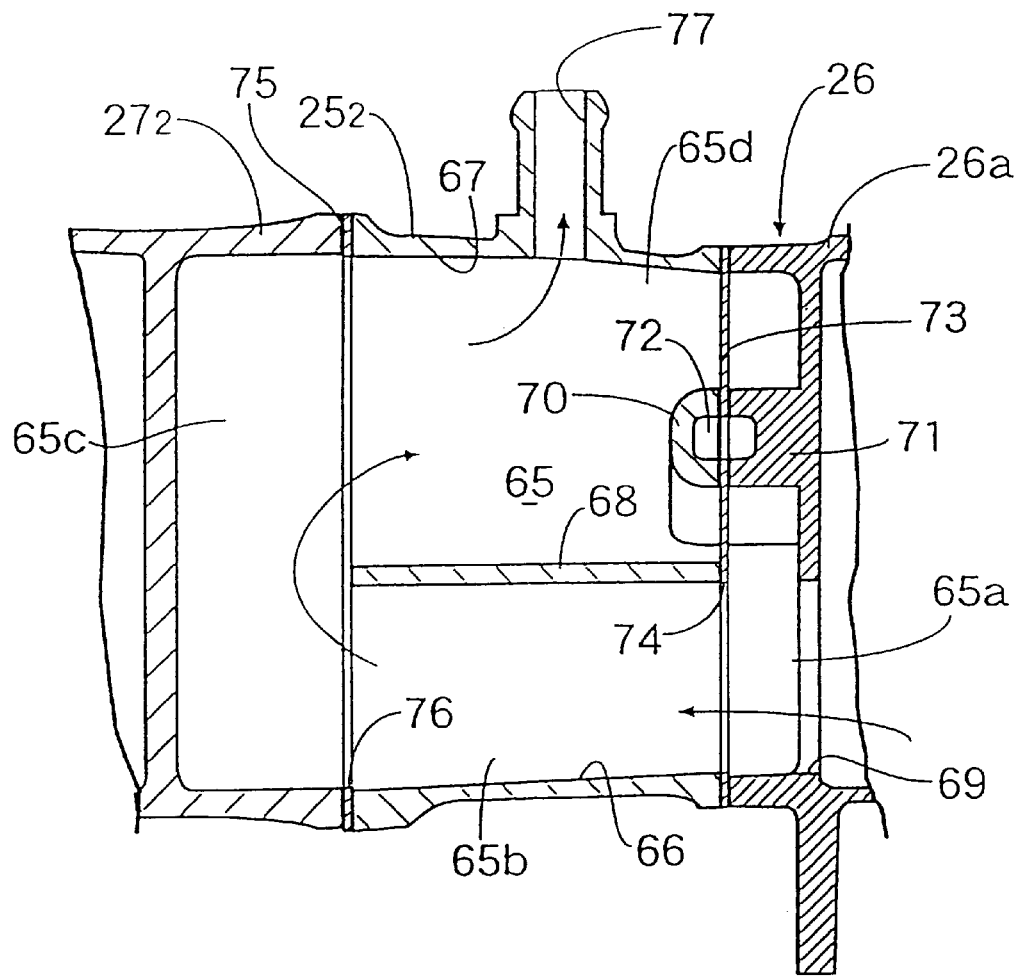
FIG. 6 is an enlarged sectional view taken on line 6—6 of FIG. 3.
Figure 7:
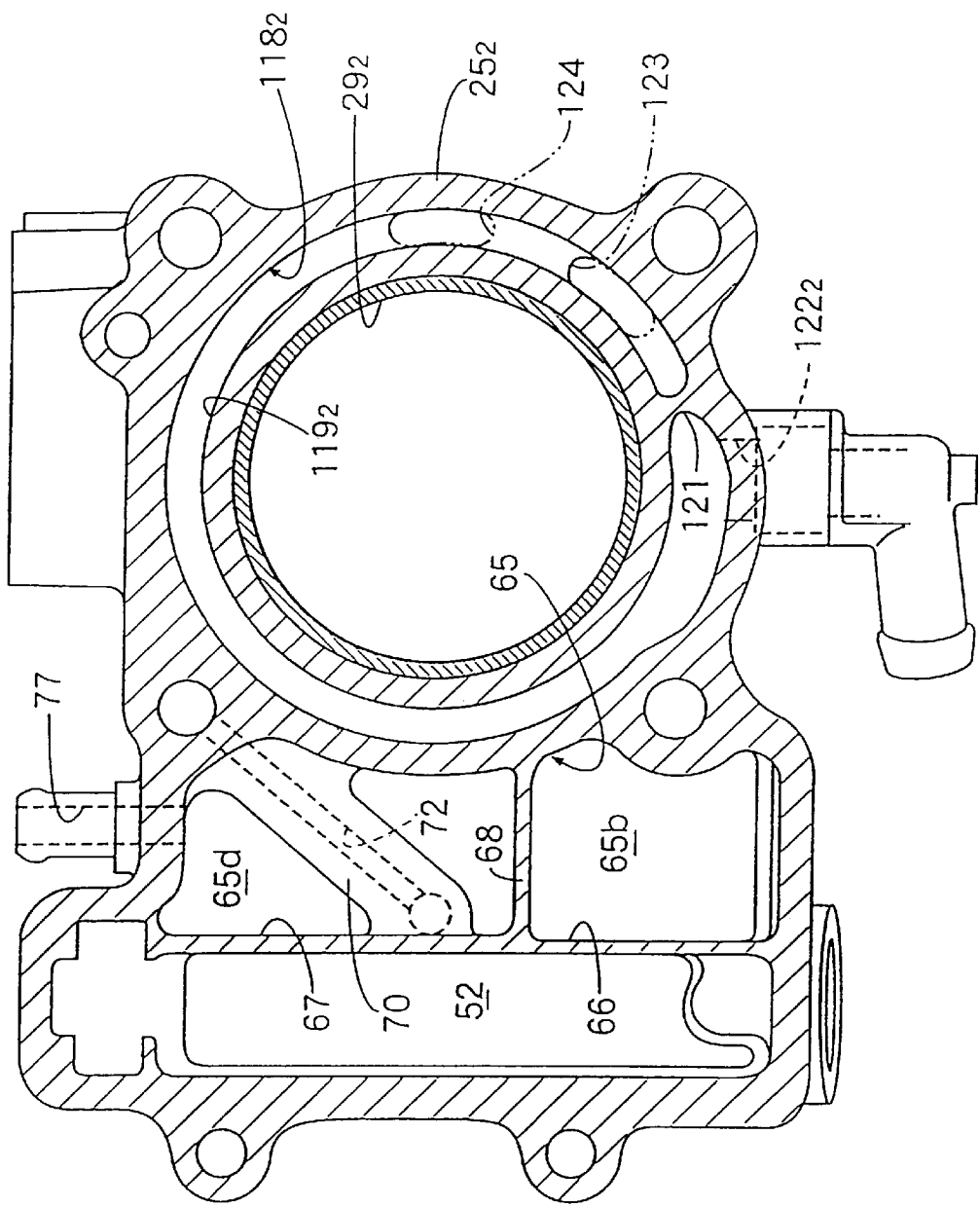
FIG. 7 is an enlarged sectional view of a cylinder block taken on line 7—7 of FIG. 3.

Referring particularly to FIGS. 6 and 7, breather chamber 65 is provided for the second cylinder block $25_2$, the second cylinder head $27_2$, and the front case half 26a of the crank case 26 in such a manner as to be located between the cam chain chamber 52 and the second cylinder bore $29_2$.

A through-hole 66 extending in parallel to the axial line of the second cylinder bore $29_2$ is provided in the lower portion of the second cylinder block $25_2$ in such a manner as to be located between the cam chain chamber 52 and the second cylinder bore $29_2$. A through-hole 67 extending in parallel to the axial line of the second cylinder bore $29_2$ is provided in the upper portion of the second cylinder block $25_2$ in such a manner as to be located between the cam chain chamber 52 and the second cylinder bore $29_2$. A partition wall 68 is interposed between the through-hole 66 and the through-hole 67.

The breather chamber 65 is composed of a first chamber 65a formed between the second cylinder block $25_2$ and the crank case 26, a second chamber 65b formed in one through-hole 66 of the through-holes 66 and 67, a third chamber 65c formed between the second cylinder block $25_2$ and the second cylinder head $27_2$, and a fourth chamber 65d formed in the other through-hole 67 of the through-holes 66 and 67.

A through-hole 69 for communicating the first chamber 65a into the crank case 26 is provided in the front case half 26a of the crank case 26. A lubricating oil passage 72 is formed between a projecting portion 70 and a rising portion 71. The projecting portion 70 is provided in the through-hole 67 in such a manner as to be integrated with a portion, near the crank case 26, of the second cylinder block $25_2$. The rising portion 71 is provided on the crank case 26 in such a manner as to be matched with the projecting portion 70. The through-hole 69 is provided in the crank case 26 at a position which is lower than the rising portion 71 to the through-hole 66. A gasket 73 is provided between the crank case 26 and the second cylinder block $25_2$ for blocking communication between the first chamber 65a and the fourth chamber 65d. The gasket 73 has an opening 74 for communicating the first chamber 65a to the second chamber 65b. A gasket 75 is provided between the second cylinder block $25_2$ and the second cylinder head $27_2$. The gasket 75 has an opening 76 for commonly communicating the second and fourth chambers 65b and 65d to the third chamber 65c.

Accordingly, the first chamber 65a is in communication with the crank case 26; the second chamber 65b formed in one through-hole 66 is in communication with the first chamber 65a; the third chamber 65c is in communication with the second chamber 65b; and the fourth chamber 65d formed in the other through-hole 67 is in communication with the third chamber 65c but is blocked from communicating with the first chamber 65a. A breather gas outlet 77 in communication with the fourth chamber 65d is provided in the upper portion of the second cylinder block $25_2$.

Figure 8:
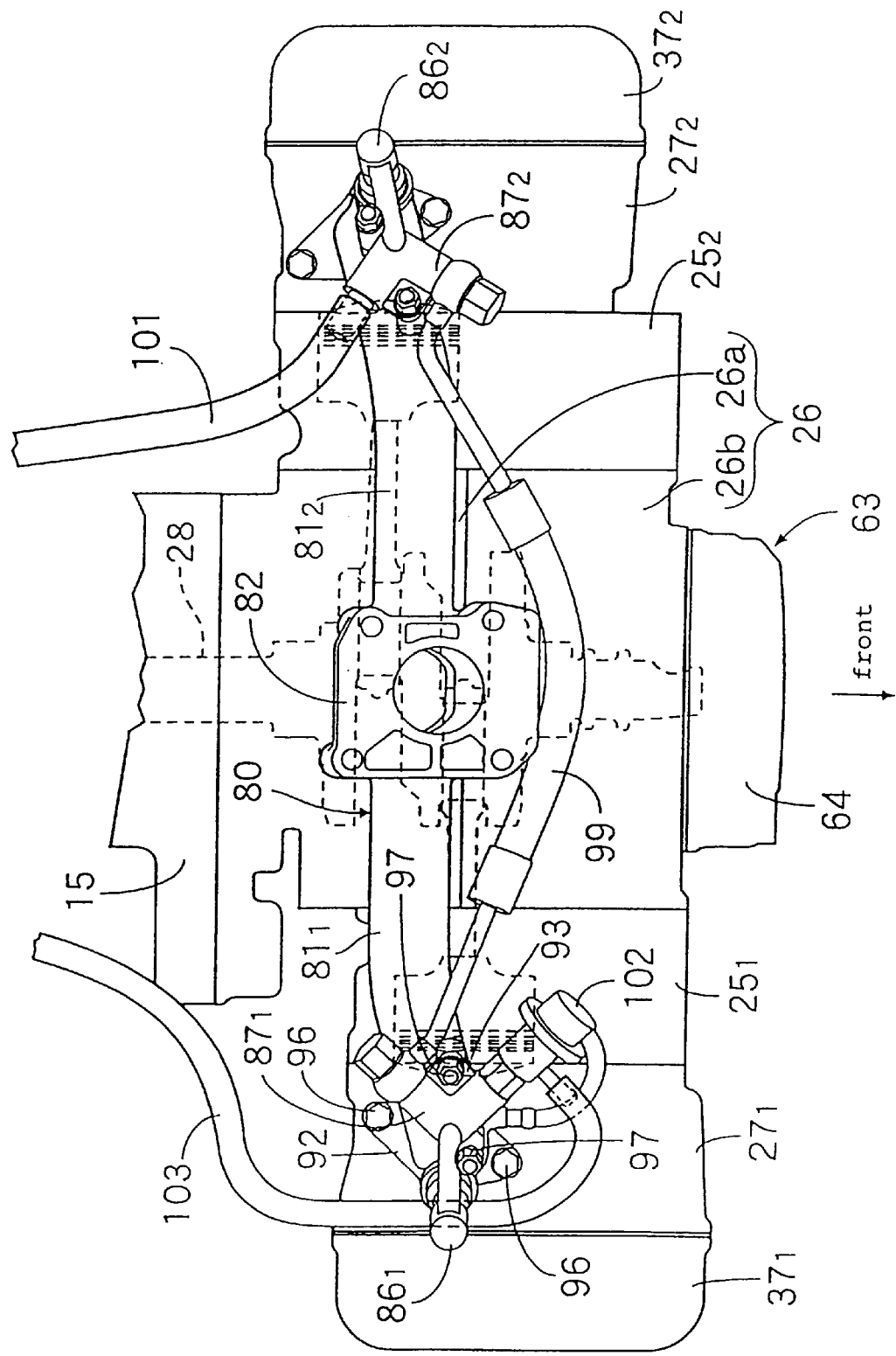
FIG. 8 is a view of FIG. 2 seen along an arrow 8.

Referring particularly to FIG. 8, an intake manifold 80 is connected to the intake ports $33_1$ and $33_2$ of the first and second cylinder heads $27_1$ and $27_2$. The intake manifold 80 is composed of an intake pipe $81_1$, an intake pipe $81_2$, and a common pipe portion 82. One end of the intake pipe $81_1$ is connected to the intake port $33_1$ of the first cylinder head $27_1$ and the other end of the intake pipe $81_1$ is connected to the common pipe portion 82. One end of the intake pipe $81_2$ is connected to the intake port $33_2$ of the second cylinder head $27_2$ and the other end of the intake pipe $81_2$ is connected to the common pipe portion 82. The common pipe portion 82 is connected to the air cleaner 23 (see FIG. 1) via a throttle body (not shown).

Referring again to FIG. 4, the intake pipe $81_1$ includes a first straight pipe portion 83, a second straight pipe portion 84, and a bent pipe portion 85. The first straight portion 83 extends along a first straight center line $CL_1$ and has a downward end connected to the intake port $33_1$. The second straight pipe portion 84 extends along a second straight center line $CL_2$ crossing the first center line $CL_1$. The bent pipe portion 85 is formed into a circular-arc shape while connecting the upstream end of the first straight pipe portion 83 to the downstream end of the second straight pipe portion 84. The upstream end of the second straight pipe portion 84 is connected to the common pipe portion 82. A fuel injection valve $86_1$ for injecting fuel to the intake port $33_1$ side is held between a portion, near the intake port $33_1$, of the intake pipe $81_1$ and a mounting member $87_1$ fastened to the intake pipe $81_1$.

A mounting flange 88 projecting outwardly is provided on an intermediate portion of the fuel injection valve $86_1$. A fitting hole 89 in which the leading end of the fuel injection valve $86_1$ is to be fitted is provided in the intake pipe $81_1$, and a seat 90 for receiving the mounting flange 88 is formed around an outer end portion of the fitting hole 89. In this case, the fitting hole 89 and the seat 90 are located in the intake pipe $81_1$ at a portion which is closer to the intake port $33_1$ than a straight line 91 which connects a crossing point $P_{C2}$ where the first and second center lines $CL_1$ and $CL_2$ cross each other and a curved center $C_C$ of the bent pipe portion 85.

A pair of fastening portions 92 and 93 are provided on the mounting member $87_1$. Both of the fastening portions 92 and 93 of the mounting member $87_1$, in which the outer end of the fuel injection valve $86_1$ is fitted, are fastened to a pair of fastening seats 94 and 95 provided on the intake pipe $81_1$ by means of a pair of bolts 96 and a pair of bolts 97, respectively. Both of the fastening seats 94 and 95 are provided at such a position as to hold the straight line 91 between the seat 90 and the same. The fastening portions 92 and 93 are formed in parallel with the seat 90.

A fuel passage $98_1$, which extends in a direction tilting at an acute angle formed with respect to the second center line $CL_2$ of the second straight pipe portion 84 and which is in communication with the outer end of the fuel injection valve $86_1$, is formed in the mounting member $87_1$.

The intake pipe $81_2$ connected to the intake port $33_2$ of the second cylinder head $27_2$ is configured like the intake pipe $81_1$. A fuel injection valve $86_2$ is held between the intake pipe $81_2$ and a mounting member $87_2$ mounted to the intake pipe $81_2$. The fuel injection valve $86_2$ is mounted to the intake pipe $81_2$ in accordance with basically the same the structure as that for mounting the fuel injection valve $86_1$ to the intake pipe $81_1$. Like the fuel passage $98_1$ formed in the mounting member $87_1$ a fuel passage $98_2$ in communication with the fuel injection valve $86_2$ is formed in the mounting member $87_2$.

The fuel passages $98_1$ and $98_2$ of both of the mounting members $87_1$ and $87_2$ are in communication with each other via a fuel conduit 99 disposed along the second straight pipe portions 84 of the intake pipes $81_1$ and $81_2$. A fuel feed pipe 101, to which fuel having been pumped from the fuel tank 22 by the fuel pump 100 (see FIG. 1) is fed from the fuel pump 100, is connected to one mounting member $87_1$ of both of the mounting members $87_1$ and $87_2$. The other mounting member $87_1$ is additionally provided with a regulator 102 for regulating a fuel pressure in the fuel passages $98_1$ and $98_2$ and the fuel conduit 99. A fuel return pipe 103 for returning excess fuel to the fuel tank 22 is connected to the regulator 102.

An exhaust manifold 106 is connected to the exhaust ports $34_1$ and $34_2$ of the first and second cylinder heads $27_1$ and $27_2$. The exhaust manifold 106 includes an exhaust pipe $107_1$ having one end connected to the exhaust port $34_1$ of the first cylinder head $27_1$ and an exhaust pipe $107_2$ having one end connected to the exhaust port $34_2$ of the second cylinder head $27_2$. The other ends of the exhaust pipes $107_1$ and $107_2$ are connected to each other on the right side of the transmission case 15 when the motorcycle is directed forwardly in the running direction, and extend to the rear side of the motorcycle.

An ignition plug $108_1$ (or $108_2$) having a leading end protruding into the combustion chamber $30_1$ (or $30_2$) is provided in the rear side, along the longitudinal direction of the motorcycle, of the cylinder head $27_1$ (or $27_2$) in such a manner as to be gradually tilted onto the cylinder block $25_1$ (or $25_2$) in the direction toward the outer end side of the ignition plug $108_1$ (or $108_2$). A mounting hole $109_1$ (or $109_2$) for mounting the ignition plug $108_1$ (or $108_2$) is provided in the cylinder head $27_1$ (or $27_2$) in such a manner as to be opened rearwardly in the longitudinal direction of the motorcycle. Since the mounting hole $109_1$ (or $109_2$) for mounting the ignition plug $108_1$ (or $108_2$) is opened rearwardly, it is possible to prevent water, mud and the like splashed up upon running of the motorcycle from permeating into the mounting hole $109_1$ (or $109_2$) as much as possible, and hence to eliminate the necessity of provision of a plug cap and the like and also eliminate the necessity of forming a drain opening in communication with the mounting hole $109_1$ (or $109_2$) in the cylinder head $27_1$ (or $27_2$).

Figure 9:
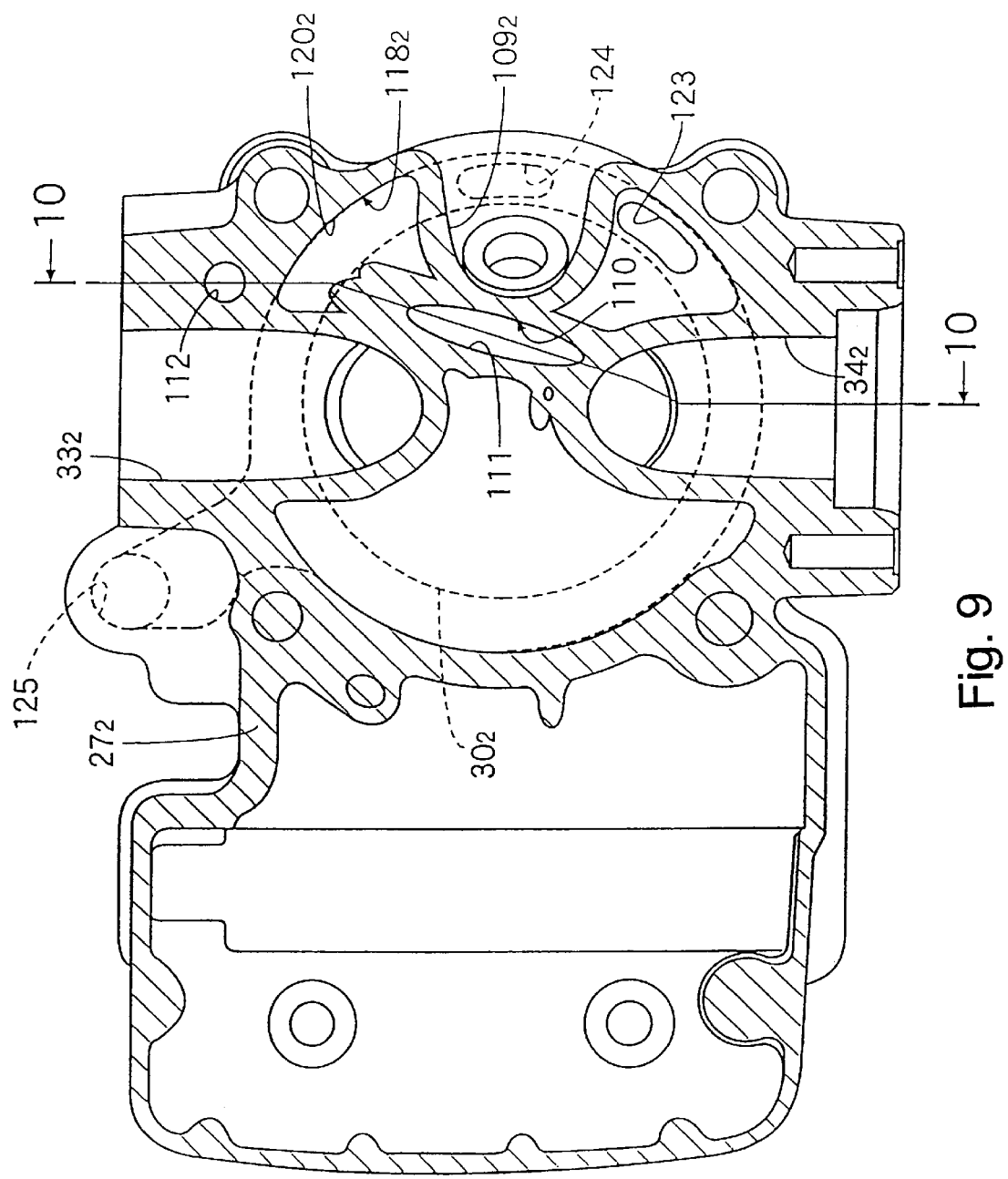
FIG. 9 is an enlarged sectional view of a cylinder head taken on line 9—9 of FIG. 3.
Figure 10:
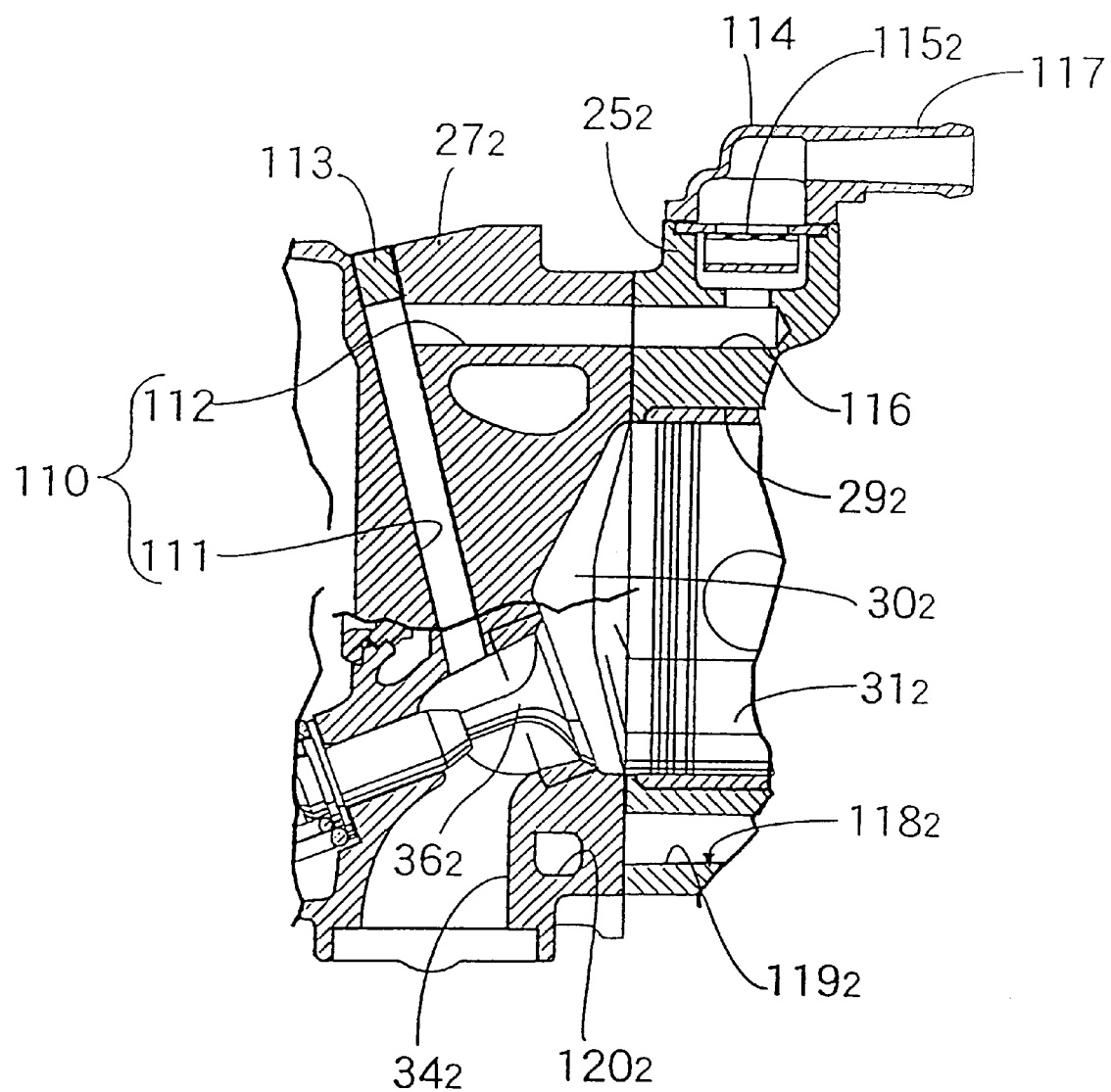
FIG. 10 is a sectional view taken on line 10—10 of FIG. 9.

Referring particularly to FIGS. 9 and 10, a secondary air feed passage 110 for feeding secondary air to exhaust gas flowing in the exhaust port $34_2$ is provided in the second cylinder head $27_2$. The secondary air feed passage 110 is composed of a first passage portion 111 and a second passage portion 112. The first passage portion 111 extends in a straight line with one end opened to a portion, near the exhaust valve $36_1$, of the inner surface of the exhaust port $34_2$ towards the downstream side of the flowing direction of exhaust gas. The second passage portion 112, which has a straight axial line bent from the axial line of the first passage portion 111 to the second cylinder block $25_2$ side, is connected to an intermediate portion of the first passage portion 111. To be more specific, the first passage portion 111 is formed by piercing the second cylinder head $27_2$ in straight line from the upper surface of the second cylinder head $27_2$ to the exhaust port $34_2$. The outer end portion of the first passage portion 111 is blocked with a plug 113. One end of the second passage portion 112 is in communication with the intermediate portion of the first passage portion 111, and the other end of the second passage portion 112 is opened to the connection plane of the second cylinder head $27_2$ to which the first cylinder block $25_2$ is connected.

A valve case 114 for a reed valve $115_2$ is mounted on the upper surface of the second cylinder block $25_2$ at a position near the second cylinder head $27_2$. A communication passage 116 for communicating the reed valve $115_2$ to the second passage portion 112 of the secondary air feed passage 110 is provided in the second cylinder block $25_2$. A connection pipe portion 117 is integrally provided with the valve case 114, and is connected to a control valve (not shown).

Like the second cylinder head $27_2$, the first cylinder head $27_1$ is provided with a secondary air feed passage (not shown) in communication with the exhaust port $34_1$, and a reed valve $115_1$ connected to the second air feed passage is mounted on the upper surface of the first cylinder block $25_1$.

A first cooling jacket $118_1$ is provided in the first cylinder block $25_1$ and the first cylinder head $27_1$, and a second cooling jacket $118_2$ is provided in the second cylinder block $25_2$ and the second cylinder head $27_2$.

The second cooling jacket $118_2$ is composed of a cylinder side cooling water passage $119_2$ provided in the second cylinder block $25_2$ in such a manner as to surround the second cylinder bore $29_2$, and a head side cooling water passage $120_2$ provided in the second cylinder head $27_2$ in such a manner as to be in communication with the cylinder side cooling water passage $119_2$.

Referring to FIG. 7, the second cylinder block $25_2$ is provided with a partition wall 121 which extends in parallel to the axial line of the second cylinder bore $29_2$ and which partitions the cylinder side cooling water passage $119_2$. A water inlet $122_2$ in communication with the cylinder side cooling water passage $119_2$ on one side of the partition wall 121 is provided beneath the second cylinder block $25_2$.

On the other hand, as shown in FIG. 9, a pair of communication passages 123 and 124 for communicating the cylinder side cooling water passage $119_2$ to the head side cooling water passage $120_2$ on the other side of the partition wall 121 are provided in the second cylinder head $27_2$. A water outlet 125, which is in communication with the head side cooling water passage $120_2$ on the side being substantially opposed to the communication passages 123 and 124 with respect to the combustion chamber $30_2$, is provided at the upper portion of the second cylinder head $27_2$.

To be more specific, both of the communication passages 123 and 124 allow the cylinder side cooling water passage $119_2$ to communicate with the head side cooling water passage $120_2$ via an opening (not shown) provided in the gasket 73 provided between the second cylinder block $25_2$ and the second cylinder head $27_2$. Both of the communication passages 123 and 124 are provided in the second cylinder head $27_2$ in proximity to each other in such a manner that the one communication passage 124 is disposed substantially corresponding to the ignition plug $108_2$.

The first cooling jacket $118_1$ includes a cylinder side cooling water passage $119_1$ provided in the first cylinder block $25_1$ in such a manner as to surround the first cylinder bore $29_1$, and a head side cooling water passage $120_1$ provided in the first cylinder head $27_1$ in such a manner as to be in communication with the cylinder side cooling water passage $119_1$. The first cooling jacket $118_1$ is configured like the second cooling jacket $118_2$. A water inlet $121_1$ in communication with the cylinder side cooling water passage $119_1$ is provided in a lower portion of the first cylinder block $25_1$, and a water outlet (not shown) in communication with the head side cooling water passage $120_1$ is provided on an upper portion of the first cylinder head 27.

Figure 11:
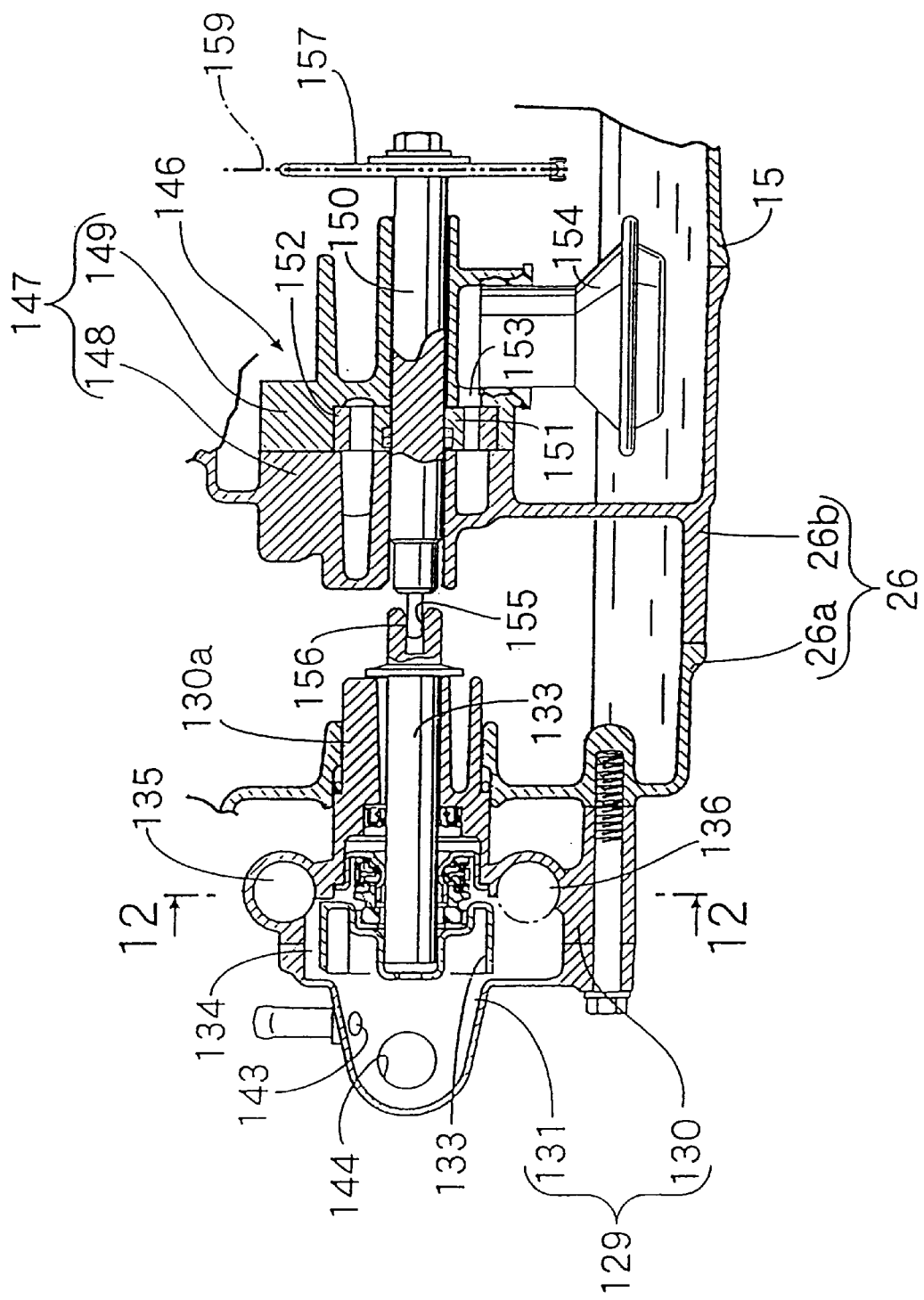
FIG. 11 is an enlarged sectional view taken on line 11—11 of FIG. 2.
Figure 12:
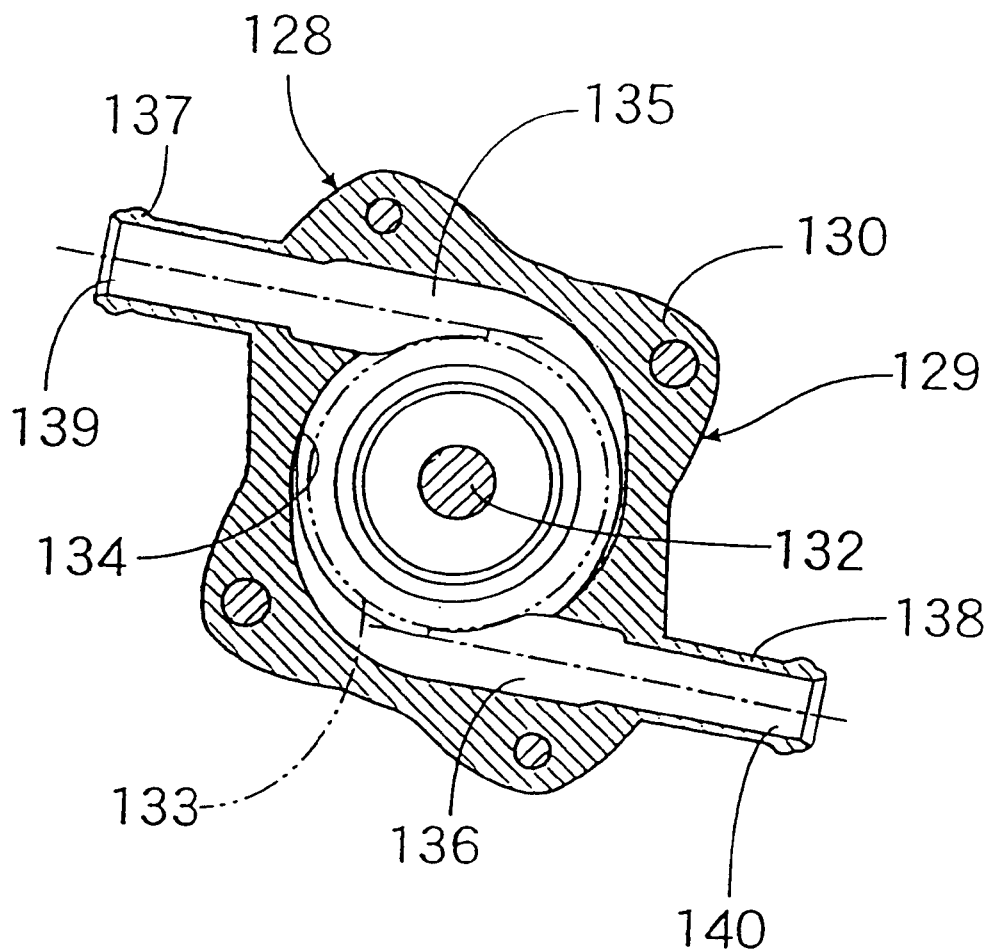
FIG. 12 is a sectional view taken on line 12—12 of FIG. 11.

Referring to particularly to FIGS. 11 and 12, a single water pump 128 is mounted to the crank case 26 in such a manner as to be located under the lowermost portions of the first and second cooling jackets $118_1$ and $118_2$ and between both of the cooling jackets $118_1$ and $118_2$.

A pump housing 129 of the water pump 128 includes a pump body 130 for rotatably supporting a pump shaft $132_1$ and a pump cover 131 fastened to the pump body 130 in such a manner as to cover an impeller 133 fixed to the pump shaft 132.

The pump body 130 is fastened to the front case half 26a of the crank case 26 in such a manner that a supporting cylinder portion 130a integrated with the pump body 130 air-tightly protrudes into the front case half 26a. The pump cover 131 is fastened to the pump body 130, to form a circular pump chamber 134 coaxial with the pump shaft 132 between the pump body 130 and the pump cover 131.

The pump shaft 132 is liquid-tightly and rotatably supported by the supporting cylinder portion 130a of the pump body 130 in a state in which one end thereof protrudes into the pump chamber 134. The impeller 133 disposed in the pump chamber 134 is fixed to the other end of the pump shaft 132.

An upper discharge passage 135 and a lower discharge passage 136 are formed in the pump housing 129. The upper discharge passage 135 is connected to an upper end portion of the pump chamber 134 and extends obliquely, upwardly therefrom along the tangential direction of the outer edge of the pump chamber 134. The lower discharge passage 136 is connected to a lower end portion of the pump chamber 134 and extends obliquely, downwardly therefrom along the tangential direction of the outer edge of the pump chamber 134. A first connection pipe 137 extending in a straight line from the upper discharge passage 135 and a second connection pipe 138 extending in a straight line from the lower discharge passage 136 are integrally provided on the pump body 130 of the pump housing 129 in such a manner that the inner ends of the first and second connection pipes 137 and 138 are in communication with the upper and lower discharge passages 135 and 136, respectively. Furthermore, the first and second discharge ports 139 and 140 are formed at the outer ends of the first and second connection pipes 137 and 138, respectively.

Referring again to FIG. 2, the first discharge port 139 formed at the outer end of the first connection pipe 137 is connected to the water inlet $122_1$ formed in the first cooling jacket $118_1$ for the first cylinder block $25_1$ and the first cylinder head $27_1$ through the first conduit 141. The first discharge port 140 formed at the outer end of the second connection pipe 138 is connected to the water inlet $122_2$ formed in the second cooling jacket $118_2$ for the second cylinder block $25_2$ and the second cylinder head $27_2$ through the second conduit 142. The length of the first conduit 141 is set to be shorter than the length of the second conduit 142. In other words, the difference in length between the first and second conduits 141 and 142 is determined such that the flow resistance corresponding to the difference in pump head between the first and second discharge ports 139 and 140 of the water pump 128 is allowed to occur on the second conduit 142 side.

The pump cover 131 has first and second suction ports 143 and 144 in communication with the pump chamber 134. The first suction port 143 is connected to a thermostat (not shown) and the second suction port 144 is connected to the radiators 24 (see FIG. 1).

If the temperature of cooling water is low before warming of the engine E, the thermostat is operated to return cooling water discharged from the water pump 128 to the first suction port 143 by way of only the first and second cooling jackets $118_1$ and $118_2$, i.e., not by way of the radiators 24. However, if the temperature of cooling water becomes high after warming of the engine E, the thermostat is operated to return cooling water discharged from the water pump 128 to the second suction port 144 by way of not only the first and second cooling jackets $118_1$ and $118_2$ but also the radiators 24.

A trochoid type oil pump 146 for feeding lubricating oil to portions to be lubricated of the engine E is provided on the inner surface, on the transmission case 15 side, of the rear case half 26b of the crank case 26 in such a manner as to be coaxial with the water pump 128.

A pump housing 147 of the oil pump 146 is composed of a pump body 148 integrally formed on the rear case half 26b and a pump cover 149 fastened to the pump body 148. A pump shaft 150 coaxial with the pump shaft 132 of the water pump 128 is rotatably supported by the pump housing 147. A pinion 151 is fixed to the pump shaft 150 in the pump housing 147, and an inner gear 152 meshed with the pinion 151 is rotatably supported by the pump housing 147. A strainer 154 is connected to a suction port 153 of the oil pump 146.

One end of the pump shaft 150 of the oil pump 146 faces to the other end of the pump shaft 132, projecting from the supporting cylinder portion 130a, of the water pump 128. An engagement plate 156 provided on the one end of the pump shaft 150 is engaged with an engagement recess 155 provided on the other end of the pump shaft 132. That is to say, both of the pump shafts 132 and 150 are connected to each other with relative rotation thereof prevented.

The other end of the pump shaft 150 of the oil pump 146 projects from the pump housing 147 and is located in the transmission case 15, and a driven sprocket 157 is fixed to the other end of the pump shaft 150.

Referring again to FIG. 3, a drive sprocket 158 corresponding to the driven sprocket 157 is fixed to the crank shaft 28 in the transmission case 15. An endless chain 159 is wound around the drive sprocket 158 and the driven sprocket 157 for transmitting the rotational power of the crank shaft 28 to the oil pump 146 and the water pump 128.

Figure 13:
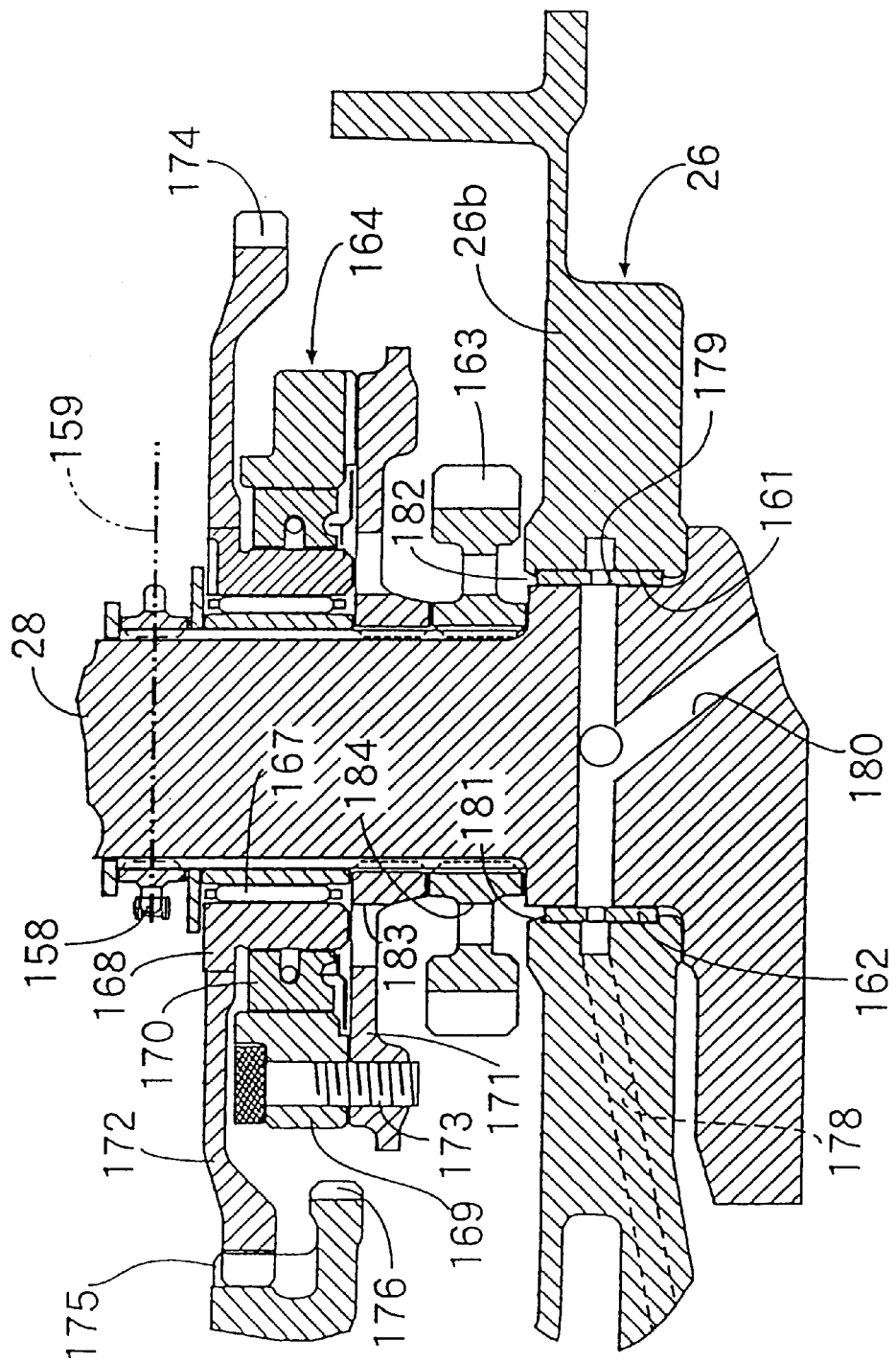
FIG. 13 is an enlarged view of an essential portion of FIG. 3.

Referring to FIG. 13, the crank shaft 28 passes through a bearing hole 161 provided in the rear case half 26b of the crank case 26 and projects towards the transmission case 15 side. A cylindrical bearing 162 is provided between the outer surface of the crank shaft 28 and the inner surface of the bearing hole 161.

On the outer side of the rear case half 26b of the crank case 26, i.e., on the transmission case 15 side, a drive gear 163 is fixed on a portion, near the rear case half 26b, of the crank shaft 28. An over-running clutch 164 is mounted on the crank shaft 28 at a position between the drive gear 163 and the drive sprocket 158.

The drive gear 163 is meshed with a driven gear (not shown) provided on a balancer shaft 165 (see FIG. 2) having an axial line parallel to the crank shaft 28 and rotatably supported by the crank case 26.

The over-running clutch 164 is used for transmitting power from a starter motor 166 (see FIG. 3) mounted to the transmission case 15 to the crank shaft 28, while blocking the power transmission from the crank shaft 28 to the starter motor 166 side. The over-running clutch 164 includes a clutch inner race 168 for coaxially surrounding the crank shaft 28 with a roller bearing 167 interposed between the crank shaft 28 and the same, a ring-shaped clutch outer race 169 for coaxially surrounding the clutch inner race 168, and a plurality of rollers 170 provided between the clutch inner race 168 and the clutch outer race 169.

An output member 171, which is spline-connected to the crank shaft 28 in such a manner as to face toward the drive gear 163, is connected to the clutch outer race 169 by means of a plurality of bolts 173. An input member 172 is fixed to the clutch inner race 168 with the clutch outer race 169 located between the output member 171 and the input member 172. A driven gear 174 is provided on the outer periphery of the input member 172. A first intermediate gear 175 meshed with the driven gear 174 is rotatably supported by the transmission case 15. A second intermediate gear 176 integrated with the first intermediate gear 175 is meshed with a drive gear 177 (see FIG. 3) provided on an output shaft of the starter motor 166.

Lubricating oil is fed from an oiling passage 178 provided in the rear case half 26b of the crank case 26 to the bearing 162. The bearing 162 has a plurality of through-holes 179 extending from the inner surface to the outer surface of the bearing 162. Accordingly, the lubricating oil fed from the oiling passage 178 is uniformly fed between the outer surface of the bearing 162 and the rear case half 26b and between the inner surface of the bearing 162 and the outer surface of the crank shaft 28. On the other hand, an oil passage 180 having one end in communication with the through-holes 179 is provided in the crank shaft 28. The oil passage 180 functions to introduce lubricating oil into a connection portion between the crank shaft 28 and the connecting rod 32₂.

A projecting portion 181, which projects radially inwardly from the end portion, on the transmission case 15 side, of the bearing hole 161, is integrally provided on the rear case half 26b of the crank case 26. An annular discharge port 182 for discharging lubricating oil fed to the bearing 162 onto the output member 171 side of the over-running clutch 164 is formed between the projecting portion 181 and the outer surface of the crank shaft 28.

The output member 171 has introducing holes 183 for introducing lubricating oil discharged from the annular discharge port 182 into the over-running clutch 164. The introducing holes 183 are provided at a plurality of positions spaced from each other in the peripheral direction of the output member 171.

The drive gear 163, which is disposed between the annular discharge port 179 and the output member 171, is fixed on the crank shaft 28 and is substantially integrated with the output member 171. Accordingly, a plurality of introducing holes 184 individually corresponding to the introducing holes 183 of the output member 171 are provided in the drive gear 163. With this configuration, lubricating oil discharged from the annular discharge port 182 is introduced in the over-running clutch 164 through the introducing holes 183 and 184 without obstruction by the drive gear 163.

The function of this embodiment will be described below. As described above, in the horizontally-opposed type four-cycle/two-cylinder engine E, the first cam shaft 40₁ (or second cam shafts 40₂) is disposed above the axial line $L_C$ of the first cylinder bore 29₁ (or second cylinder bore 29₂); and on the projection plane perpendicular to the axial line of the crank shaft 28 including the axial line of the first cylinder bore 29₁ (or second cylinder bore 29₂), an angle $\alpha_I$ formed between the axial line $L_C$ of the first cylinder bore 29₁ (or second cylinder bore 29₂) and the operational axial line $L_I$ of the intake valve 35₁ (or 35₂) is larger than an angle $\alpha_O$ formed between the axial line $L_C$ of the first cylinder bore 29₁ (or the second cylinder bore 29₂) and the operational axial line $L_O$ of the exhaust valve 36₁ (or 36₂).

With this configuration, the outer end of the exhaust valve 35₁ (or 35₂) can be disposed in such a manner as to be made as close to the axial line of the cylinder bore 29₁ (or 29₂) as possible. Accordingly, it is possible to avoid restriction of the bank angle of the motorcycle at the outer ends of the exhaust valves 35₁ and 35₂, and hence to make the mounting position of the engine E as low as possible while ensuring the ground clearance of the motorcycle. This is effective to make the center of gravity of the motorcycle lower and also to improve the steering of the motorcycle.

Furthermore, on the projection plane perpendicular to the axial line of the crank shaft 28 including the axial line of the first cylinder bore 29₁ (or the second cylinder bore 29₂), the crossing point $P_{C1}$ at which the operational axial lines $L_I$ and $L_O$ of the intake valve 35₁ (or 35₂) and the exhaust valve 36₁ (or 36₂) cross each other is located lower than the axial line $L_C$ of the cylinder bore 29₁ (or 29₂). Accordingly, it is possible to easily ensure a squish area of the combustion chamber 30₁ (or 30₂) on the intake valve 35₁ (or 35₂) side having a diameter larger than the exhaust valve 36₁ (or 36₂), and hence to make the squish area on the intake side nearly equal to that on the exhaust side.

The first and second cylinder blocks 25₁ and 25₂ are commonly connected to the crank case 28 in such a manner that the axial line of the first cylinder bore 29₁ of the first cylinder block 25₁ is offset from the axial line of the second cylinder bore 29₂ of the second cylinder block 25₂ onto one side along the axial line of the crank shaft 28. Furthermore, on one side along the axial line of the crank shaft 28, the cam chain chamber 52 is provided for the crank case 26, the cylinder blocks 25₁ and 25₂ and the cylinder heads 27₁ and 27₂. Accordingly, a relatively large space is formed between the second cylinder bore 29₂ and the cam chain chamber 52, so that a breather chamber 65 can be provided for the crank case 26, the second cylinder block 25₂ and the second cylinder head 27₂ by making effective use of the space. As a result, it is possible to form the breather chamber 65 having a relatively large capacity while avoiding enlargement of the size of the entire engine, and hence to improve the breather performance.

The breather chamber 65 is composed of the first chamber 65a in communication with the interior of the crank case 26, the second chamber 65b in communication with the first chamber 65a, the third chamber 65c in communication with the second chamber 65b, and the fourth chamber 65d in communication with the third chamber 65c, but is blocked from the first chamber 65a; and the breather gas outlet 77 in communication with the fourth chamber 65d is provided in the second cylinder block 25₂. Accordingly, since the breather chamber 65 has a labyrinth structure, it is possible to effectively separate oil mist from breather gas in the breather chamber 65 and hence to further improve the breather performance.

The intake pipe 81₁ (or 81₂) in communication with the intake port 33₁ (or 33₂) of the first cylinder head 27₁ (or the second cylinder head 27₂) includes the first straight pipe portion 83 extending along the first straight center line $CL_1$, the second straight pipe portion 84 extending along the second straight center line $CL_2$ crossing the first center line $CL_1$, and the bent pipe portion 85 formed into a circular-arc shape while connecting the upstream end of the first straight pipe portion 83 to the downstream end of the second straight pipe portion 84; and the fuel injection valve 86₁ (or 86₂), for injecting fuel to the intake port 33₁ (or 33₂), is held between the intake pipe 81₁ (or 81₂) and the mounting member 87₁ (or 87₂) fastened to the intake pipe 81₁ (81₂). Furthermore, the seat 90 for receiving the fuel injection valve 86₁ (or 86₂) is provided in the intake pipe 81₁ (or 81₂) at a portion which is closer to the intake port 33₁ (or 33₂) than the straight line 91 which connects the crossing point $P_{C2}$ where the first and second center lines $CL_1$ and $CL_2$ cross each other and the curved center $C_C$ of the bent pipe portion 85. As a result, it is possible to suppress the projecting amount of the fuel injection valve 86₁ (or 86₂) from the outer end of the cylinder head 27₁ (or 27₂) and hence to make the entire engine including the fuel injection system compact.

The fastening seats 94 and 95 for fastening the mounting member 87₁ (or 87₂) are provided on the intake pipe 81₁ (or 81₂) with the straight line 91 located between the seat 90 and the same. As a result, the fastening seats 94 and 95 of the mounting member 87₁ (or 87₂) are provided on the second straight pipe portion 84 side while the outer end of the fuel injection valve 86₁ (or 86₂) is disposed at a position relatively far away from the first center line $CL_1$, so that a space for disposing the mounting member 87₁ (or 87₂) can be relatively largely ensured.

Since the seat 90 and the fastening seats 94 and 95 are formed in parallel to each other, it becomes easy to mount the fuel injection valve 86₁ (or 86₂) to the intake pipe 81₁ (or 81₂), and also it is possible to improve the mounting reliability.

The fuel passage $98_1$ (or $98_2$), which extends in a direction tilting at an acute angle formed with respect to the second center line $CL_2$ and which is connected to the fuel injection valve $86_1$ (or $86_2$), is formed in the mounting member $87_1$ (or $87_2$), so that the fuel conduit 99 connected to the fuel passage $98_1$ (or $98_2$) can be disposed along the second straight pipe portion 84 of the intake pipe $81_1$ (or $81_2$). Accordingly, it is easy to ensure a space for disposing the fuel conduit 99 and to protect the fuel conduit 99. This is advantageous in preventing occurrence of vapor gas due to vibration of the fuel conduit 99.

The secondary air feed passage 110 for feeding secondary air to exhaust gas flowing in the exhaust port $34_1$ (or $34_2$) is provided in the first cylinder head $27_1$ (or second cylinder head $27_2$). The secondary air feed passage 110 is composed of the first passage portion 111 and the second passage portion 112. The first passage portion 111 extends in a straight line having one end opened in the inner surface of the exhaust port $34_1$ (or $34_2$) onto the downstream side of the flowing direction of exhaust gas. The second passage portion 112, which has a straight axial line bent from the axial line of the first passage portion 111 onto the cylinder block $25_1$ (or $25_2$) side, is connected to the first passage portion 111.

The shape of the secondary air feed passage 110 causes the secondary air to be sucked from the secondary air feed passage 110 into the exhaust port $34_1$ (or $34_2$) by the flow of exhaust gas in the exhaust port $34_1$ (or $34_2$). This makes it possible to prevent the permeation of exhaust gas into the secondary air feed passage 110 as mush as possible. Furthermore, the second passage portion 112 is in communication with the first passage portion 111 in such a manner as to be bent from the first passage portion 111. Accordingly, even if exhaust gas permeates in the first passage portion 111 of the secondary air passage 110, it is possible to prevent the exhaust gas thus permeated in the first passage portion 111 from further permeating into the second passage portion 112 side, and hence to shorten the length of the secondary air feed passage 110.

Since the reed valve $115_1$ (or $115_2$) connected to the secondary air feed passage 110 is mounted on the outer surface of the cylinder block $25_1$ (or $25_2$), it is possible to avoid the enlargement of the entire engine accompanied by arrangement of the reed valve $115_1$ (or $115_2$).

The first cooling jacket $118_1$ is provided in the first cylinder block $25_1$ and the first cylinder head $27_1$, and the second cooling jacket $118_2$ is provided in the second cylinder block $25_2$ and the second cylinder head $27_2$. The cooling jacket $118_1$ (or $118_2$) is composed of the cylinder side cooling water passage $119_1$ (or $119_2$) provided in the cylinder block $25_1$ (or $25_2$) in such a manner as to surround the cylinder bore $29_1$ (or $29_2$). The head side cooling water passage $120_1$ (or $120_2$) is provided in the cylinder head $27_1$ (or $27_2$) in such a manner as to be in communication with the cylinder side cooling water passage $119_1$ (or $119_2$). The cylinder block $25_1$ (or $25_2$) is provided with a partition wall 121 which extends in parallel to the axial line of the cylinder bore $29_1$ (or $29_2$) for partitioning the cylinder side cooling water passage $119_1$ (or $119_2$). The water inlet $122_1$ (or $122_2$) in communication with the cylinder side cooling water passage $119_1$ (or $119_2$) is provided in the cylinder block $25_1$ (or $25_2$) on one side of the partition wall 121. The cylinder head $27_1$ (or $27_2$) has a pair of communication passages 123 and 124 on the other side of the partition wall 121 for communicating the cylinder side cooling water passage $119_1$ (or $119_2$) to the head side cooling water passage $120_1$ or ($120_2$).

Accordingly, cooling water which has been fed from the water inlet $122_1$ (or $122_2$) to the cylinder side cooling water passage $119_1$ (or $119_2$) on the one side of the partition wall 121, flows in the cylinder side cooling water passage $119_1$ (or $119_2$) toward the other side of the partition wall 121 in such a manner as to substantially go around the cylinder bore $29_1$ (or $29_2$). The cooling water is then introduced to the head side cooling water passage $120_1$ (or $120_2$) via the communication passages 123 and 124.

On the other hand, the cylinder head $27_1$ (or $27_2$) has the water outlet 125 which is located substantially opposite to the communication passages 123 and 124 with respect to the combustion chamber $30_1$ (or $30_2$) in such a manner as to be in communication with the cylinder side cooling water passage $120_1$ (or $120_2$). Accordingly, the cooling water having been introduced in the head side cooling water passage $120_1$ (or $120_2$) flows in the head side cooling water passage $120_1$ (or $120_2$) toward the water outlet 125 disposed substantially opposite to the communication passages 123 and 124 with respect to the combustion chamber $30_1$ (or $30_2$).

To be more specific, cooling water smoothly flows from the water inlet $122_1$ (or $122_2$) to the water outlet 125 by way of the cylinder side cooling water passage $119_1$ (or $119_2$), the communicating passages 123 and 124, and the head side cooling water passage $120_1$ (or $120_2$). As a result, it is possible to effectively cool the cylinder blocks $25_1$ and $25_2$ and the cylinder heads $27_1$ and $27_2$.

The ignition plug $108_1$ (or $108_2$) having a leading end protruding in the combustion chamber $30_1$ (or $30_2$) is provided in the cylinder head $27_1$ (or $27_2$) in such a manner as to be tilted onto the cylinder block $25_1$ (or $25_2$) in the direction toward the outer end side of the ignition plug $108_1$ (or $108_2$). One communication passage 124 of both of the communication passages 123 and 124 is disposed at a position substantially corresponding to the ignition plug $108_1$ (or $108_2$). As a result, the flow area of a portion, corresponding to the communication passage 124, of the head side cooling water passage $120_1$ (or $120_2$) becomes inevitably small, so that it is possible to improve the cooling performance of the cylinder head $27_1$ (or $27_2$) in the vicinity of the ignition plug $108_1$ (or $108_2$) by increasing the flow rate of cooling water at the above portion of the head side cooling water passage $120_1$ (or $120_2$).

The single water pump 128 commonly used for the first and second cooling jackets $118_1$ and $118_2$ is disposed under the lowermost portions of both of the cooling jackets $118_1$ and $118_2$ and between both of the cooling jackets $118_1$ and $118_2$. The first and second discharge ports 139 and 140 of the water pump 128 are connected to the water inlets $122_1$ and $122_2$ of both of the cooling jackets $118_1$ and $118_2$, respectively.

The pump housing 129 of the water pump 128 contains a circular pump chamber 134 for rotatably containing the impeller 133; the upper discharge passage 135 connected to the upper end of the pump chamber 134 and extending obliquely, upwardly therefrom; and the lower discharge port 136 connected to the lower end of the pump chamber 134 and extending obliquely, downwardly therefrom. The first and second connection pipes 137 and 138 with their outer end openings taken as the first and second discharge ports 139 and 140 are arranged continuously to the pump housing 129 in such a manner that they extend in straight lines from the upper and lower discharge passages 135 and 136 and the inner ends thereof are in communication with the upper and lower discharge passages 135 and 136, respectively.

Accordingly, the path from the upper end of the pump chamber 134 to the first discharge port 139 at the outer end of the first connection pipe 137 by way of the upper discharge passage 135 extends obliquely in such a manner that the first discharge port 139 is located at the highest position, while the path from the lower end of the pump chamber 134 to the second discharge port 140 at the outer end of the second connection pipe 138 by way of the lower discharge passage 136 extends obliquely in such a manner that the lower end of the pump chamber 134 is located at the highest position. To be more specific, the path from the second discharge port 140 to the first discharge port 139 by way of the lower discharge passage 136, the pump chamber 134, and the upper discharge passage 135 does not have any portion in which air remains. As a result, it is possible to eliminate the necessity of providing a structure specialized for ventilation such as an air vent bolt and to easily extract air from the water pump 128.

The first discharge port 139 is connected to the first cooling jacket $118_1$ by means of the first conduit 141, and the second discharge port 140 is connected to the second cooling jacket $118_2$ by means of the second conduit 142. Furthermore, the length of the first conduit 141 is set to be shorter than that of the second conduit 142 in order that the flow resistance corresponding to the difference in pump head between the first and second discharge ports 139 and 140 of the water pump 128 is allowed to occur on the second conduit 142 side. As a result, since the difference in pump head between the first and second discharge ports 139 and 140 of the water pump 128 is balanced with the flow resistance occurring at the first and second conduits 141 and 142, it is possible to uniformly feed cooling water from the common water pump 128 to the first and second cooling jackets $118_1$ and $118_2$.

The over-running clutch 164 including the input member 172 to which power is inputted from the starter motor 166 and the output member 171 connected to the crank shaft 28 is mounted on the crank shaft 28 in the transmission case 15. The bearing hole 161 allowing the crank shaft 28 to pass therethrough is provided in the rear case half 26b of the crank case 26, and the bearing 162 is provided between the inner surface of the bearing hole 161 and the outer surface of the crank shaft 28.

Furthermore, the over-running clutch 164 is mounted to the crank shaft 28 with its output member 171 disposed on the bearing 162 side, and the annular discharge port 182 is formed between the projecting portion 181 and the outer surface of the crank shaft 28. The projecting portion 181 is integrally provided on the rear case half 26b of the crank case 26 in such a manner as to project radially inwardly from the end, on the transmission case 15 side, of the bearing hole 161. The oiling passage 178 for feeding lubricating oil to the bearing 162 is provided in the rear case half 26b of the crank case 26. Accordingly, the lubricating oil fed to the bearing 162 is discharged from the annular discharge port 182 onto the output member 171 side of the over-running clutch 164.

The output member 171 has introducing holes 183 for introducing the lubricating oil discharged from the annular discharge port 182 into the over-running clutch 164.

Accordingly, when the lubricating oil fed to the bearing 162 is discharged from the annular discharge port 182 onto the output member 171 of the over-running clutch 164, the lubricating oil is correspondingly introduced from the introducing holes 183 of the output member 171 rotated together with the crank shaft 28 into the over-running clutch 164. As a result, it is possible to eliminate the necessity of forming lubricating oil feed holes in the over-running clutch 164, and hence to reduce the number of processing steps and the manufacturing cost. Furthermore, since the lubricating oil fed from the bearing 162 is used for lubricating the over-running clutch 164, it is possible to miniaturize the oil pump 146 without decreasing the amount of lubrication oil discharged from the oil pump 146.

While the embodiment of the present invention has been described, the present invention is not limited thereto, and it is to be understood that various changes in design may be made without departing from the spirit or the scope of the claims.

For example, although the present invention is applied to a horizontally-opposed type engine E in the above-described embodiment, the present invention can also be applied to a V-type engine, and also to engines of a type in which a plurality of cylinder bores are provided in each cylinder block.

As described above, according to the first aspect of the present invention, since the breather chamber can be provided in the crank case, the second cylinder block and the second cylinder head by making effective use of a relatively large space formed between the second cylinder bore and the cam chain chamber, it is possible to form a breather chamber having a relatively large capacity without incurring enlargement of the entire engine, and hence to improve the breather performance.

According to the second aspect of the present invention, since the breather chamber has a labyrinth structure, it is possible to effectively separate oil mist from breather gas and hence to further improve the breather performance.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An engine comprising:

first and second cylinder blocks having first and second cylinder bores extending therethrough in directions opposed to each other at 180° with respect to each other, said first and second cylinder blocks being commonly connected to a crank case in such a manner that an axial line of said first cylinder bore is offset from an axial line of said second cylinder bore toward one end of said crank shaft along the axial line of said crank shaft;

first and second cylinder heads forming combustion chambers between said first and second cylinder heads and pistons slidably fitted in said cylinder bores are connected to said first and second cylinder blocks, respectively;

a cam chain chamber provided in said crank case, said cylinder blocks and said cylinder heads on said one end of said crank shaft along the axial line of said crank shaft; and first and second cam chains for reducing rotational power of said crank shaft into half and transmitting the reduced rotational power to ends of first and second cam shafts linked to intake valves and exhaust valves for taking air in said combustion chambers and discharging the exhaust gas from said combustion chambers, respectively, said first and second cam chains being contained in said cam chain chamber; and a breather chamber provided in said second cylinder block, said second cylinder head and said crank case at a position between said cam chain chamber and said second cylinder bore.

2. The engine according to claim 1, further comprising:
a pair of through-holes extending in parallel to the axial line of said second cylinder bore are provided in said second cylinder block;
said breather chamber further including:
   a first chamber formed between said second cylinder block and said crank case and in communication with an interior of said crank case;
   a second chamber in communication with said first chamber and formed in one of said pair of through-holes;
   a third chamber formed between said second cylinder block and said second cylinder head and in communication with said second chamber; and
   a fourth chamber in communication with said third chamber, but blocked from said first chamber and formed in the other of said pair of through-holes; and
a breather gas outlet in communication with said fourth chamber is provided in said second cylinder block.

3. The engine according to claim 2, further comprising a lubricating oil passage formed between a projecting portion and a rising portion, said projecting portion being provided in said other of said pair of through holes, and said rising portion being provided on the crank case, said projecting portion and said rising portion cooperating with each other to form said lubricating oil passage.

4. The engine according to claim 2, further comprising:
a first gasket provided between the crank case and the second cylinder block, said first gasket including a first opening formed therein for communicating the first chamber to the second chamber; and
a second gasket provided between the second cylinder block and the second cylinder head, said second gasket including a second opening for commonly communicating the second and fourth chambers to the third chamber.

5. A breather apparatus for an engine, said engine including:
first and second cylinder blocks having first and second cylinder bores extending therethrough in directions opposed to each other at 180° with respect to each other, the first and second cylinder blocks being commonly connected to a crank case in such a manner that an axial line of the first cylinder bore is offset from an axial line of the second cylinder bore toward one end of the crank shaft along the axial line of the crank shaft;
first and second cylinder heads forming combustion chambers between the first and second cylinder heads and pistons slidably fitted in the cylinder bores are connected to the first and second cylinder blocks, respectively;
a cam chain chamber provided in the crank case, the cylinder blocks and the cylinder heads on the one end of the crank shaft along the axial line of the crank shaft; and
first and second cam chains for reducing rotational power of the crank shaft into half and transmitting the reduced rotational power to ends of first and second cam shafts linked to intake valves and exhaust valves for taking air in the combustion chambers and discharging the exhaust gas from the combustion chambers, respectively, the first and second cam chains being contained in the cam chain chamber,
said breather apparatus comprising: a breather chamber provided in the second cylinder block, the second cylinder head and the crank case at a position between the cam chain chamber and the second cylinder bore.

6. The breather apparatus according to claim 5, further comprising:
a pair of through-holes extending in parallel to the axial line of the second cylinder bore are provided in the second cylinder block;
said breather chamber further including:
   a first chamber formed between the second cylinder block and the crank case and in communication with an interior of the crank case;
   a second chamber in communication with said first chamber and formed in one of said pair of through-holes;
   a third chamber formed between the second cylinder block and the second cylinder head and in communication with said second chamber; and
   a fourth chamber in communication with said third chamber, but blocked from said first chamber and formed in the other of said pair of through-holes; and
a breather gas outlet in communication with said fourth chamber is provided in the second cylinder block.

7. The breather apparatus according to claim 6, further comprising a lubricating oil passage formed between a projecting portion and a rising portion, said projecting portion being provided in said other of said pair of through holes, and said rising portion being provided on the crank case, said projecting portion and said rising portion cooperating with each other to form said lubricating oil passage.

8. The breather apparatus according to claim 6, further comprising:
a first gasket provided between the crank case and the second cylinder block, said first gasket including a first opening formed therein for communicating the first chamber to the second chamber; and
a second gasket provided between the second cylinder block and the second cylinder head, said second gasket including a second opening for commonly communicating the second and fourth chambers to the third chamber.

9. A breather apparatus for an engine, the engine including: first and second cylinder blocks having first and second cylinder bores extending therethrough in directions opposed to each other at 180° with respect to each other; first and second cylinder heads forming combustion chambers between the first and second cylinder heads and pistons slidably fitted in the cylinder bores; a cam chain chamber provided in the crank case, the cylinder blocks and the cylinder heads on one end of the crank shaft along the axial line of the crank shaft; and first and second cam chains, said breather apparatus comprising a breather chamber provided in the second cylinder block, the second cylinder head and the crank case at a position between the cam chain chamber and the second cylinder bore.

10. The breather apparatus according to claim 9, further comprising:
a pair of through-holes extending in parallel to the axial line of the second cylinder bore are provided in the second cylinder block;
said breather chamber further including:
   a first chamber formed between the second cylinder block and the crank case and in communication with an interior of the crank case;
   a second chamber in communication with said first chamber and formed in one of said pair of through-holes;

a third chamber formed between the second cylinder block and the second cylinder head and in communication with said second chamber; and a fourth chamber in communication with said third chamber, but blocked from said first chamber and formed in the other of said pair of through-holes; and a breather gas outlet in communication with said fourth chamber is provided in the second cylinder block.

11. The breather apparatus according to claim 10, further comprising a lubricating oil passage formed between a projecting portion and a rising portion, said projecting portion being provided in said other of said pair of through holes, and said rising portion being provided on the crank case, said projecting portion and said rising portion cooperating with each other to form said lubricating oil passage.

12. The breather apparatus according to claim 10, further comprising:

a first gasket provided between the crank case and the second cylinder block, said first gasket including a first opening formed therein for communicating the first chamber to the second chamber; and a second gasket provided between the second cylinder block and the second cylinder head, said second gasket including a second opening for commonly communicating the second and fourth chambers to the third chamber.

* * * * *